United States Patent [19]

Barner, Jr. et al.

[11] 4,434,486
[45] Feb. 28, 1984

[54] SELF-SWITCHED DATA PORT IN-BAND SIGNALING PROTOCOL

[75] Inventors: Robert P. Barner, Jr., Rockville; Joseph M. Bensadon, Germantown, both of Md.; Jacques A. Besseyre, Cagnes, France; Harold G. Markey, Raleigh, N.C.

[73] Assignee: IBM Corporation, Armonk, N.Y.

[21] Appl. No.: 314,938

[22] Filed: Oct. 26, 1981

[51] Int. Cl.³ .............................................. H04J 3/12
[52] U.S. Cl. ................................................. 370/110.1
[58] Field of Search ..................... 370/110.1, 58, 104; 178/3; 179/2 DP

[56] References Cited

U.S. PATENT DOCUMENTS 3,502,808  3/1970  Brown ........................................ 178/3
3,925,600  12/1975 Cardwell et al. .
3,978,449  8/1976  Sanders et al. .
4,330,886  5/1982  Fukuda et al. ................... 179/2 DP
4,354,265  10/1982 Nyberg et al. .................... 179/2 DP

FOREIGN PATENT DOCUMENTS 864728  4/1961  United Kingdom .

OTHER PUBLICATIONS

A. Kleitsch, "The Tandem Talents of X.21 and SNA," *Data Comm.*, vol. 10, Mar. 1981, No. 3.
H. C. Folts, "Procedures for Circuit-Switched Service in Synchronous Public Data Networks," *IEEE Trans. on Comm.*, vol. 28, No. 4, (Apr. 1980).
H. V. Bertine, "Physical Level Protocols," *IEEE Trans. on Comm.*, vol. COM-28, No. 4, Apr. 1980.

*Primary Examiner*—Douglas W. Olms
*Attorney, Agent, or Firm*—John E. Hoel

[57] ABSTRACT

A self-switched in-band signaling communication apparatus is disclosed which enables the switching of the signaling mode to the data mode on a single transmission line between a data terminal equipment or data communication equipment and the data port of a satellite communications controller, and the opposite switching from the data mode to the signaling mode under a single control bit. Signaling to and from the data port of the satellite communications controller is carried out using conventional dialing pulses at a signaling rate which is independent of the line data rate. The apparatus provides for the multipoint communication between a plurality of data terminal equipments using a unique multipoint turn-around process which provides a mobile bandwidth capability for the communications system.

30 Claims, 18 Drawing Figures

FIG. 2
SWITCHING ADAPTOR 602
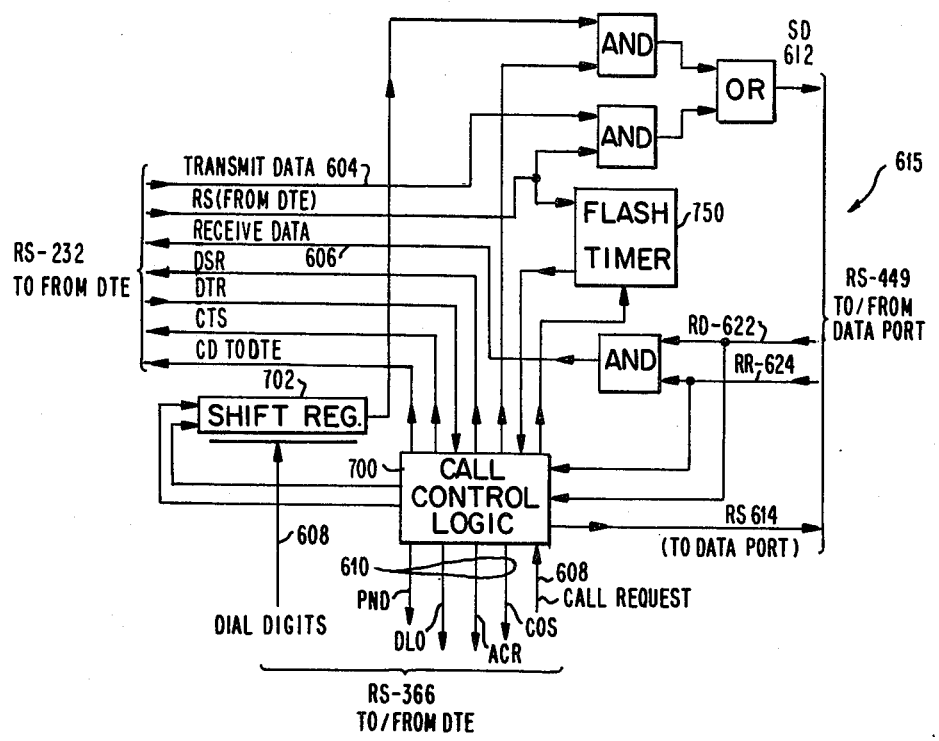
FIG. 6 CALL PROCESSOR INTERFACE TIMING
SELECT 724
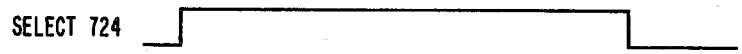
CLOCK 726
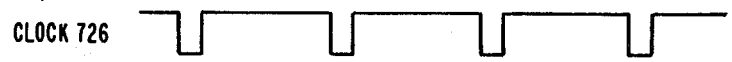
E-LEAD BUS 504 E
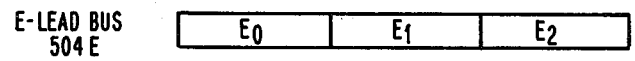
M-LEAD BUS 504 M
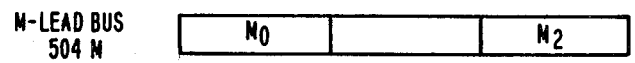

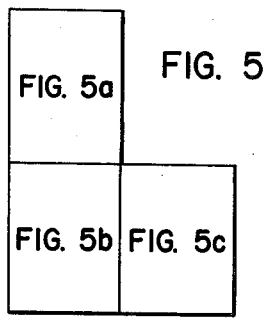
FIG. 5
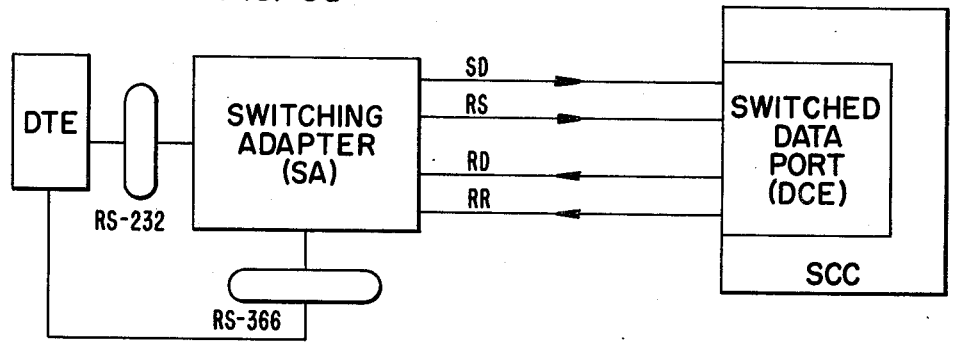
FIG. 5a
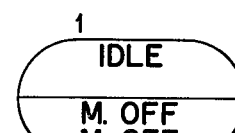

SELF-SWITCHED DATA PORT IN-BAND SIGNALING PROTOCOL

FIELD OF THE INVENTION

The invention disclosed broadly relates to communications apparatus and more particularly relates to in-band signaling communications apparatus.

BACKGROUND OF THE INVENTION

In telephony, the term in-band signaling generally means the inclusion of control signals in the same communication medium with traffic signals. Most telephone signaling is still done out of band, for example rotary dialing, which requires a separate E lead and M lead in addition to the voice traffic line. An example of in-band signaling in telephony is multi-frequency dialing wherein tone frequencies characteristic of dialing digits are interposed on the same communication line with voice signals.

The conventional means for establishing a switched data call is the use of an auto-call unit in combination with a modem, both of which are connected in parallel between a data terminal equipment and the communication channel. During the call connection signaling portion of the session, the data terminal equipment sends digits to the auto-call unit which converts them to dialing pulses which are transmitted over the communication channel, thereby establishing the call connection. After the call connection has been established, control is released to the modem, which converts the signals from the data terminal equipment to suitable signals for transmission over the communication link, which starts the traffic portion of the session. During the call connection period, the data terminal equipment (DTE) sends multiple-bit digits to the auto-call unit which in turn sends corresponding dial-pulse sequences on the telephone line. After selection and ringing, the auto answer unit seizes the line and connects the modem to the line. At that time, the modem sends an answer tone which constitutes the beginning of a handshaking protocol. After a time-out or after the detection of the tone, the calling auto-call unit switches the line to the calling modem and a handshaking protocol takes place between the terminals. Conventional auto-call units employ the EIA standard RS-366 which provides for an interface between a data terminal equipment and auto-calling equipment for data communication.

Still another type of control signaling connection for a data terminal equipment to a communications controller is the use of an associated voice port along with the digital data port, to establish the call connection. To each switched digital data port there is associated a voice port and a line. The call connection dialing is carried out on the voice port line as is done for a normal voice call. A comparative table in the communications controller associates the voice port line with the digital data port. Upon completion of the selection process through the associated voice port, the digital data port is connected to the remote digital data port at the other end of the communication link for the traffic portion of the session. There is no voice traffic on the associated voice port line and no traffic-handling resources are allocated to the voice port for the call. The problem with this approach is that it requires the dedication of one voice port for each digital data port, which is a costly waste of the voice port resources.

OBJECTS OF THE INVENTION

It is therefore an object of the invention to provide an improved self-switched in-band signaling communication apparatus.

It is another object of the invention to provide an in-band signaling communication apparatus whose signaling rate is independent of the line data rate.

It is still another object of the invention to provide an improved in-band signaling communication apparatus which eliminates the need for an associated voice port line to establish the call connection.

It is still a further object of the invention to provide an improved in-band signaling communication apparatus which establishes an improved means for multipoint connections.

It is yet a further object of the invention to provide an improved in-band signaling communication apparatus which provides a mobile bandwidth for the turn-around of multipoint connections in the communication system.

SUMMARY OF THE INVENTION

These and other objects, features and advantages of the invention are accomplished by the self-switched in-band signaling communication apparatus disclosed herein. The apparatus enables the switching of the signaling mode to the data mode on a single transmission line between a data terminal equipment or data communication equipment and the data port of a satellite communications controller, and the opposite switching from the data mode to the signaling mode under a single control bit. Signaling to and from the data port of the satellite communications controller is carried out using conventional dialing pulses at a signaling rate which is independent of the line data rate. The apparatus provides for the multipoint communication between a plurality of data terminal equipments using a unique multipoint turn-around process which provides a mobile bandwidth capability for the communications system.

DESCRIPTION OF THE FIGURES

These and other objects, features and advantages of the invention will be more fully appreciated with reference to the accompanying figures.

FIG. 2 is a more detailed functional block diagram of the switching adaptor.

FIG. 6 is a timing diagram for the interconnection of the data port with the call processor.

DISCUSSION OF THE PREFERRED EMBODIMENT

A self-switched in-band signaling communication apparatus is disclosed which enables the switching of the signaling mode to the data mode on a single transmission line between a data terminal equipment or data communication equipment and the data port of a satellite communications controller, and the opposite switching from the data mode to the signaling mode under a single control bit. Signaling to and from the data port of the satellite communications controller is carried out using conventional dialing pulses at a signaling rate which is independent of the line data rate. The apparatus provides for the multipoint communication between a plurality of data terminal equipments using a unique multipoint turn-around process which provides a mobile bandwidth capability for the communications system.

Figure 1:
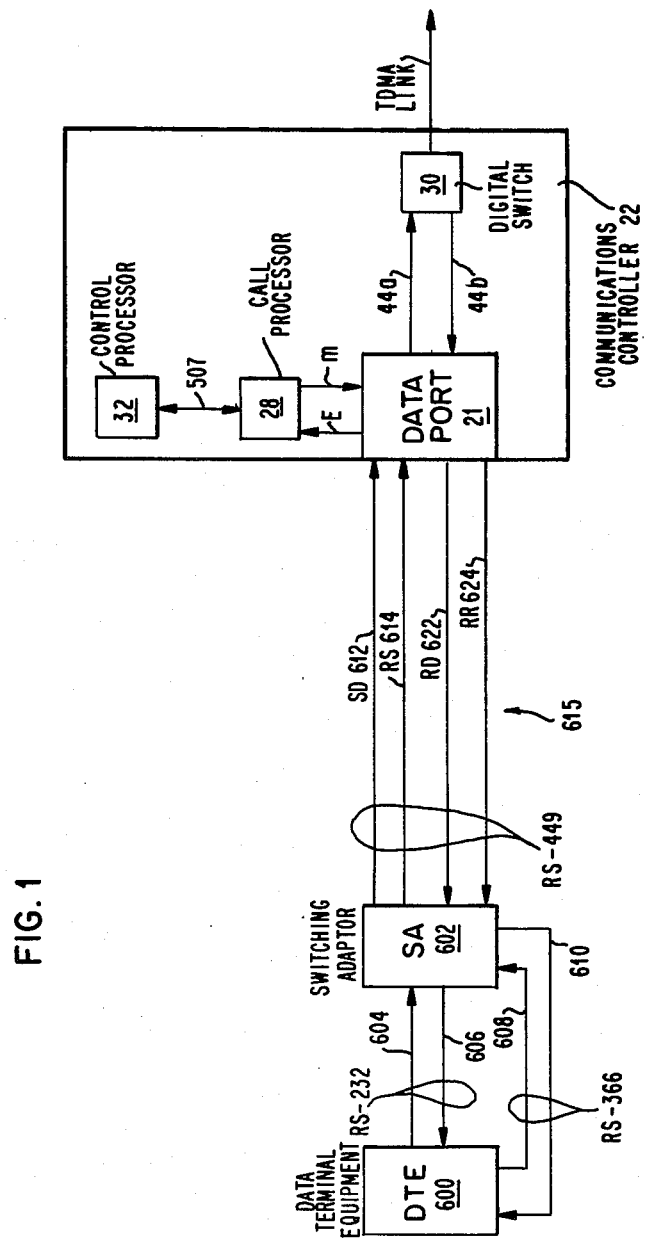
FIG. 1 is an overall functional block diagram of the self-switched in-band signaling communication apparatus.

FIG. 1 is an overall functional block diagram of the self-switched in-band signaling communication apparatus. A data terminal equipment 600 which can be for example a digital computer, is connected by means of an output line 604 to a switch adaptor 602 and an input line 606 from the switch adaptor 602 which carries data traffic to and from the data terminal equipment 600. The connection 604 and 606 can be the EIA standard RS-232-C which is the standard interface between data terminal equipment and data communication equipment 35 employing serial binary data interchange published by the Electronic Industries Association August 1969. In addition, there is a control output 608 from the data terminal equipment 600 to the switch adaptor 602 and a control input 610 from the switch adaptor 602 to the data terminal equipment 600 which transfers control information between the data terminal equipment 600 and the switch adaptor 602. This control connection can be based on the EIA standard RS-366 which is the standard interface between data terminal equipment and automatic calling equipment for data communication, published by the Electronic Industries Association August 1969.

The switch adaptor 602, shown in FIG. 2, operates as follows. When the DTE 600 wants to communicate, the DTE 600 senses that the switch adaptor has set the data set ready line (DSR). The data terminal equipment 600 then turns on the data terminal ready (DTR) line to the switch adaptor 602. The DTE 600 then raises the call request line (CRQ) to the switch adaptor 602. In the switch adaptor 602, a call control logic 700 is a PLA logic circuit or microprocessor which carries out the protocol functions between the RS-366, the RS-232, and the RS-449 communication channels. At this point, the call control logic 700 raises the request-to-send (RS) line 614 to the data port 21. As will be described herein, the data port and satellite communications controller (SCC) 22 respond with the receiver ready line (RR) 624, which goes up. The call connection information can now be transferred over the RS-366 channel from the DTE 600 over line 608 to the serializer 702 in the switch adaptor 602. The serializer 702 will convert the four-bit binary digit for each numeral representing the destination address being called, for example, into a conventional sequence of dialing digits which will be output over the SD line 612 to the data port 21, as is further described herein. The switch adaptor call control logic 700 signals to the DTE 600 on the call originating status (COS) line that the call connection digits have been successfully transmitted from the switch adaptor 602 to the data port 21. At this point the DTE 600 turns off the call request line (CRQ). After the state diagram of FIG. 5 has been cycled through, and the call connection signals have been processed by the call processor 28 in the SCC 22, the switch adaptor 602 has its call control logic 700 turn on the carrier detect (CD) line to the DTE 600. The DTE 600 then turns on the request-to-send line (RS) in the RS 232 channel and waits for the clear-to-send (CTS) signal from the switch adaptor 602 to the DTE 600. The switch adaptor 602 then turns off the call origination signal (COS) on line 610 to the DTE 600 and data transfer can commence over line 604 from the DTE 600 to the SD line 612 as soon as the clear-to-send (CTS) line is turned on by the switch adaptor 602. All of the above operation is based on the conventional protocols established for RS-449, RS-366, and RS-232.

The communication channel 615 comprises the SD line 612, the RS line 614, output from the switch adaptor 602 and the receive data line 622 and the receiver ready line 624 input to the switch adaptor 602. This communication channel can be the EIA standard RS-449 which is a general purpose 37 position and nine position interface for a data terminal equipment and data circuit terminating equipment employing serial binary data interchange, as is described in the Electronic Industries Association publication of November 1977. The communication channel 615 is connected to the RS-449 input 648 of the data port which is shown in greater detail in FIG. 3. The basic data port 21 is described in further detail in the copending patent application by N. F. Brickman, et al. entitled "Call Processor for a Satellite Communications Controller," Ser. No. 133,733, filed Mar. 25, 1980, and in the copending patent application by J. A. Alvarez, et al., Ser. No. 130,498, filed Mar. 14, 1980 entitled "TDMA Broadcasting, Multipoint and Conferencing Communication Apparatus and Method," both applications assigned to the instant assignee. The SD line 612 and the RS line 614 pass through the interface 648 and are input to the switching logic 626. The RD line 622 and the RR line 624 are output from the switching logic 626 and pass through the interface 648 and out on the communication channel 615. The switching logic 626, which is shown in greater detail in a first embodiment in FIG. 10 and in a second embodiment in FIG. 4, has an additional input line 642 from the signal state bit in the status register 640 of the data port 21. The switching logic 626 has a further additional input line 644 from the port valid bit of the status register 640 for the data port 21. The switching logic 626 has an SCC transmit data line 194 (IN) which is input to the SCC transmit shift register 195. The switching logic 626 has an SCC receive data line 194 (OUT) which is connected to the receive register 242. The switching logic 626 has an E lead output 504E connected to the call processor 28 and has an M lead input 504M connected to the call processor 28. The switching logic 626 has a carrier detect output line 646 which is connected to one bit input of the transmit RAM 214 of the data port 21.

First Embodiment of the Switch Logic 626

Figure 4A:
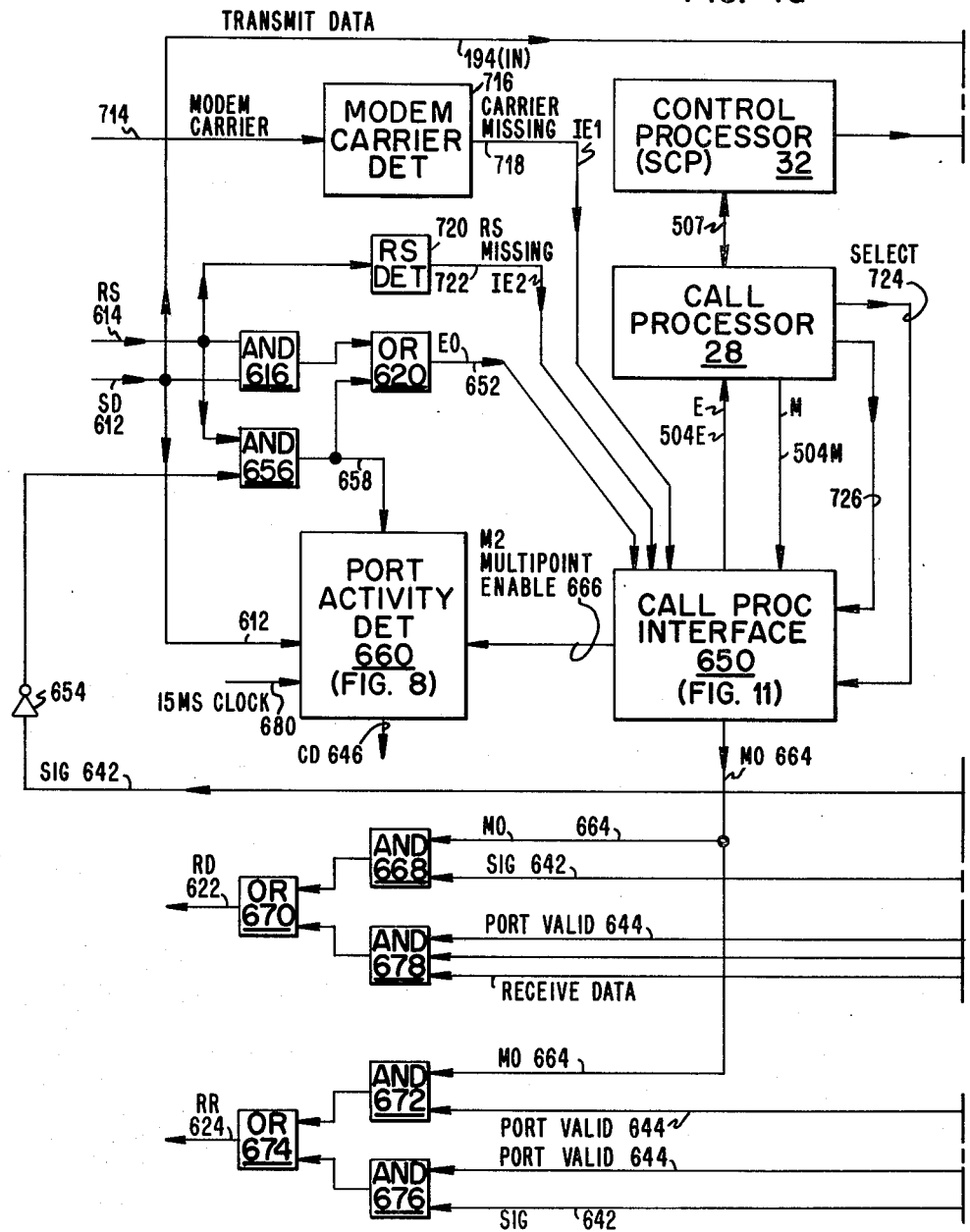
FIG. 4, including a and b, a detailed logic diagram showing the second embodiment of the switching logic in the data port.
Figure 4B:
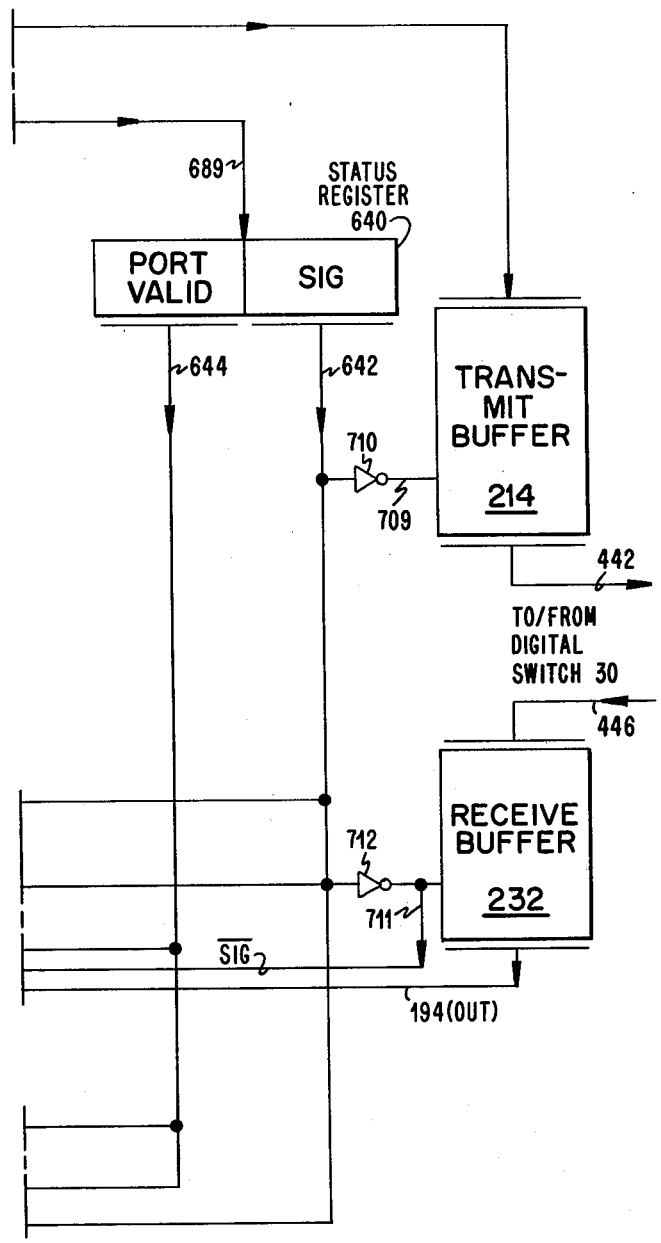
Figure 10:
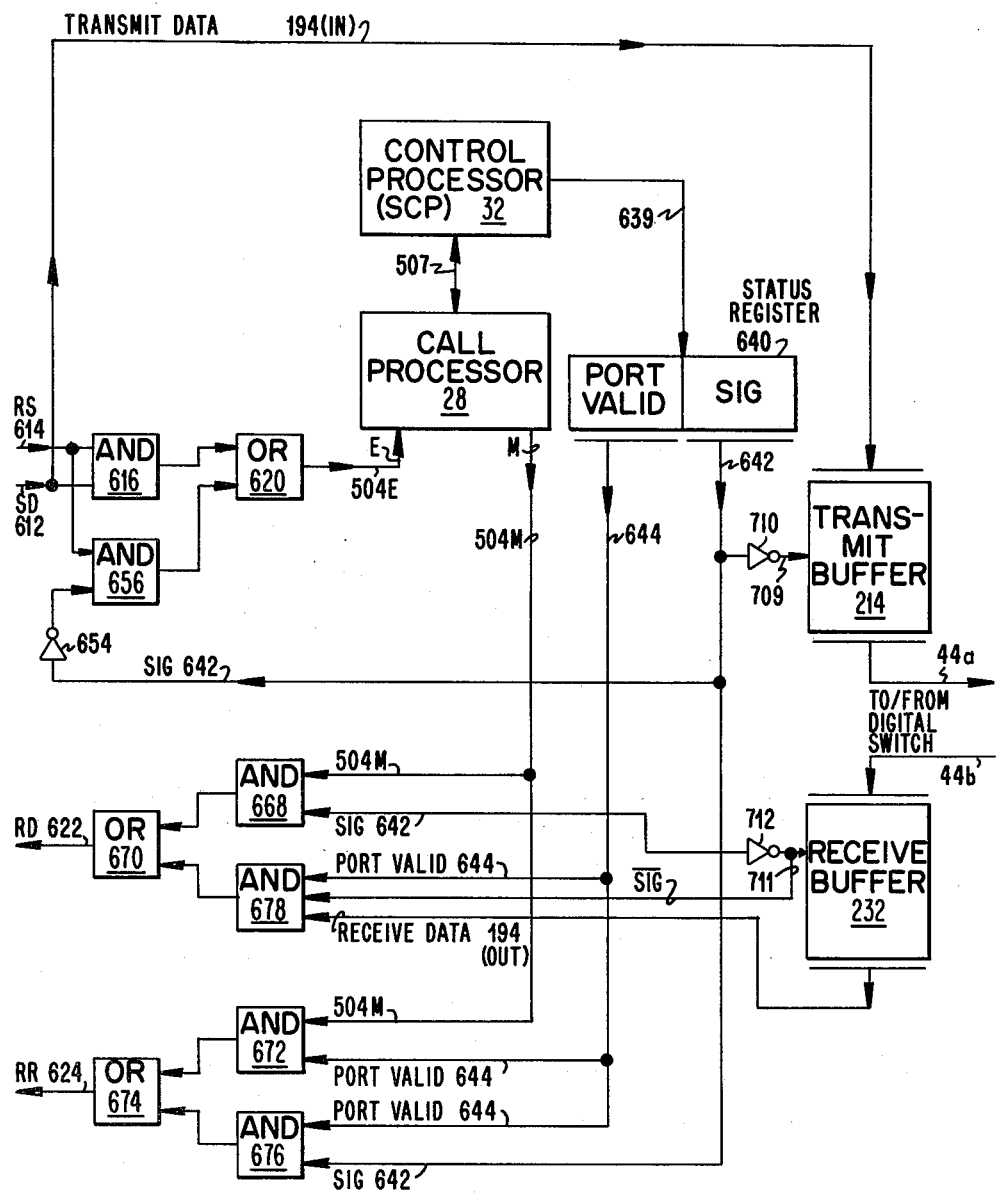
FIG. 10 is a detailed logic diagram showing the first embodiment of the switching logic in the data port.

For those applications where the call connection information transmitted between the switch adaptor 602 and the data port 21 constitutes conventional call establishment and response signals similar to those employed in conventional telephone voice processing, the first embodiment of the switching logic 622 shown in FIG. 10 is employed. Alternately, for those applications where additional information such as modem carrier loss detection and RS line 614 loss detection are to be transferred to the call processor 28, then a second embodiment of the switch logic 626 shown in FIG. 4, is to be employed.

With regard to the first embodiment of the switch logic shown in FIG. 10, self-switched data port in-band signaling is achieved wherein data signals are selectively transferred through the data port 21 between the data terminal equipment 600 and the TDMA digital switch 30 in the communications controller 22 or alternately control signals are transferred between the data terminal equipment 600 and the call processor 28 in the communications controller 22.

The switching logic 626 includes a first AND gate 616 having a first input connected to the RS line 614 and a second input connected to the SD line 612. The status register 640 has an input 639 connected to the control processor (SCP) 32. The control processor 32 is coupled to the call processor 28 over line 507 in the communications controller 22. The status register 640 stores a status word output from the control processor 32, which includes a call connection signaling bit SIG, for indicating when the data port 21 is in a call connection state, as indicated by a binary one, or alternately when the data port 21 is in a data traffic state, as indicated by a binary zero.

A second AND gate 656 has a first input connected to the RS line 614 and a second input connected through a first inverter 654 to the signaling bit SIG of the status register 640. A first OR gate 620 has a first input connected to the output of the first AND gate 616 and has a second input connected to the output of the second AND gate 656 and an output connected as an E lead input 504E to the call processor 28.

A transmit buffer 214 has a data input 194 (IN) which is connected to the SD line 612, a data output which is the transmit bus 44A connected to the digital switch 30, and an enabling control line 709 which is connected through a second inverter 710 to the signaling bit SIG of the status register 640.

The quiescent state for the data port 21 is represented by a low state for the RS line 614, and this does not satisfy the first AND gate 616 nor the second AND gate 656. Thus, the first OR gate 620 maintains the E lead input 504E to the call processor 28 in a low state.

When the switch adaptor 602, in response to a request from the data terminal equipment 600, raises the RS line 614 to a high state, and during that interval when the signaling bit SIG is in a low state, the data port 21 is being signaled that the data terminal equipment 600 is initiating a call request to the data port 21. The second AND gate 656 becomes satisfied and thus the OR gate 620 raises the E lead input 504E to the call processor 28, to a high state.

In response to the high state of the E lead input 504E, the call processor 28 transfers the call request to the control processor 32. The control processor 32 then outputs over line 639, a status word to the status register 640, raising the signaling bit SIG to a high state, indicating that the data port 21 is now in the call connection state.

At this juncture, the transmit buffer 214 is disabled by the enabling control line 709, through the inverter 710, in response to the high state of the signaling bit SIG. This prevents information input on the SD line 612 and conducted over the line 194 (IN) from being transmitted to the digital switch 30.

The second AND gate 656 now becomes unsatisfied in response to the high state of the signaling bit SIG. This permits the output from the first AND gate 616 to modulate the OR gate 620 and thus the E lead input 504E to the call processor 28.

The SD line 612 can now pass call connection dialing pulses through the first AND gate 616 and through the OR gate 620, as E lead input signals on the E lead input 504E to the call processor 28. In this manner, the SD line 612, from the switch adaptor 602 to the data port 21, is selectively switched from a data transfer line connected to the digital switch 30, to an in-band call connection dial pulse control line connected to the call processor 28.

The receive buffer 232 has a data input from the receive bus 44B connected to the digital switch 30, a data output 194 (OUT), and an enabling control line 711 connected through a third inverter 712 to the signaling bit SIG of the status register 640. The receive buffer 232 is disabled in response to the high state of the signaling bit SIG during the call connection state for the data port, preventing data from being output from the receive buffer 232 over line 194 (OUT).

A third AND gate 668 has a first input connected to an M lead output 504M of the call processor 28 and a second input connected to the signaling bit SIG of the status register 640, the high state of the signaling bit SIG during the call connection state for the data port enabling the M lead 504M to modulate the output of the third AND gate 668.

A second OR gate 670 has a first input connected to the output of the third AND gate 668 and an output connected to the RD line 622.

The call processor 28 outputs call connection dialing pulses on the M lead 504M which pass through the third AND gate 668 and pass through the second OR gate 670 to the RD line 622. This provides a call connection response to the switch adaptor 602, and then to the data terminal equipment 600, on the RD line 622 during the call connection state for the data port 21.

The status register 640 further includes a port valid bit in the status word, for indicating that the control processor 32 has allocated communication channels in the digital switch 30 for use by the data port 21. The status output line 639 from the control processor 632 will raise the port valid bit to a high level at the time this allocation is made, which is generally the same time that the signaling bit SIG is raised to a high level in the status register 640.

The fourth AND gate 678 has a first input connected to the port valid bit of the status register 640, a second input connected to the data output 194 (OUT) of the receive buffer 232, and a third input connected to line 711 for the complement of SIG, and an output connected to the second input of the second OR gate 670. The high state of the port valid bit enables the data output line 194 (OUT) from the receive buffer 232, to modulate the output of the fourth AND gate 678 when SIG is off. During the call connection state which SIG is on, AND 678 is off.

In this manner, the RD line 622 from the data port 21 to the switch adaptor 602 is selectively switched from a data transfer line connected to the digital switch 30, to an in-band call connection dial pulse control line connected to the call processor 28.

A fifth AND gate 672 has a first input connected to the M lead output 504M of the call processor 28 and a second input connected to the port valid bit. A third OR gate 674 has a first input connected to the output of the fifth AND gate 672 and an output connected to the RR line 624.

A sixth AND gate 676 has a first input connected to the port valid bit and a second input connected to the signaling bit SIG, and an output connected as a second input to the third OR gate 674. The sixth AND gate 676 will force the RR line 624 into a high state during the call connection state for the data port 21.

When the control processor 32 determines the completion of the call connection state for the data port 21, it changes the signaling bit SIG in the status register 640 to a low state and it will further control over the line 507, the call processor 28 to raise the M lead output 504M to a high state. This signifies the termination of the call connection state and the commencement of the data traffic state for the data port 21.

The sixth AND gate 676 then becomes unsatisfied in response to the low state of the signaling bit SIG, thereby permitting the RR line 624 output from the third OR gate 674 to be modulated by the M lead output 504M from the call processor 28, through the fifth AND gate 672. This will maintain the RR line 624 in the high state for the duration of the data traffic state for the data port 21.

The receive buffer 232 is enabled over the line 711, through the inverter 712, in response to the low state of the signaling bit SIG. This enables data to be output from line 44B from the digital switch 30, over line 194 (OUT) to the fourth AND gate 678. Since SIG is down, the line 711 is up and now enables AND gate 678 for the duration of the data transfer mode.

The third AND gate 668 is then unsatisfied by the low state of the signaling bit SIG, permitting the RD line 622 output from the second OR gate 670, to be modulated by the data output over line 194 (OUT) from the receive buffer 232, through the fourth AND gate 678, for the duration of the data traffic state for the data port 21.

In this manner, the RD line 622 from the data port 21 to the switch adaptor 602, is selectively switched from an in-band call connection dial pulse control line connected to the call processor 28, to a data transfer line connected to the digital switch 30.

The second AND gate 656 becomes satisfied by the low state of the signaling bit SIG, as passed through the inverter 654, preventing data input on the SD line 612 from passing through the first OR gate 620 to the call processor E lead input 504E, for the duration of the data traffic state for the data port 21.

The transmit buffer 214 is then enabled by line 709, through the inverter 710, in response to the low state of the signaling bit SIG, providing a data input to the digital switch 30 over line 194 (IN) from the SD line 612, for the duration of the data traffic state for the data port 21.

In this manner, the SD line 612 from the switch adaptor 602 to the data port 21, is selectively switched from an in-band call connection dial pulse control line connected to the call processor 28, to a data transfer line connected to the digital switch 30.

Second Embodiment of the Switching Logic 626

For those applications where the information to be transmitted from the switching adaptor 602 to the data port 21 includes error information such as if the modem carrier signal is missing or if the RS signal is missing on line 614, in order to ensure the accurate transmission of data to the data port, or where multipoint communication or other functions are to be selectively invoked by the control processor 32 between a data port 21 and other data ports in the local communications controller 22 and/or other data ports located at remote communications controllers 22, the second embodiment of the switching logic 626, shown in FIG. 4, is employed.

Figure 8:
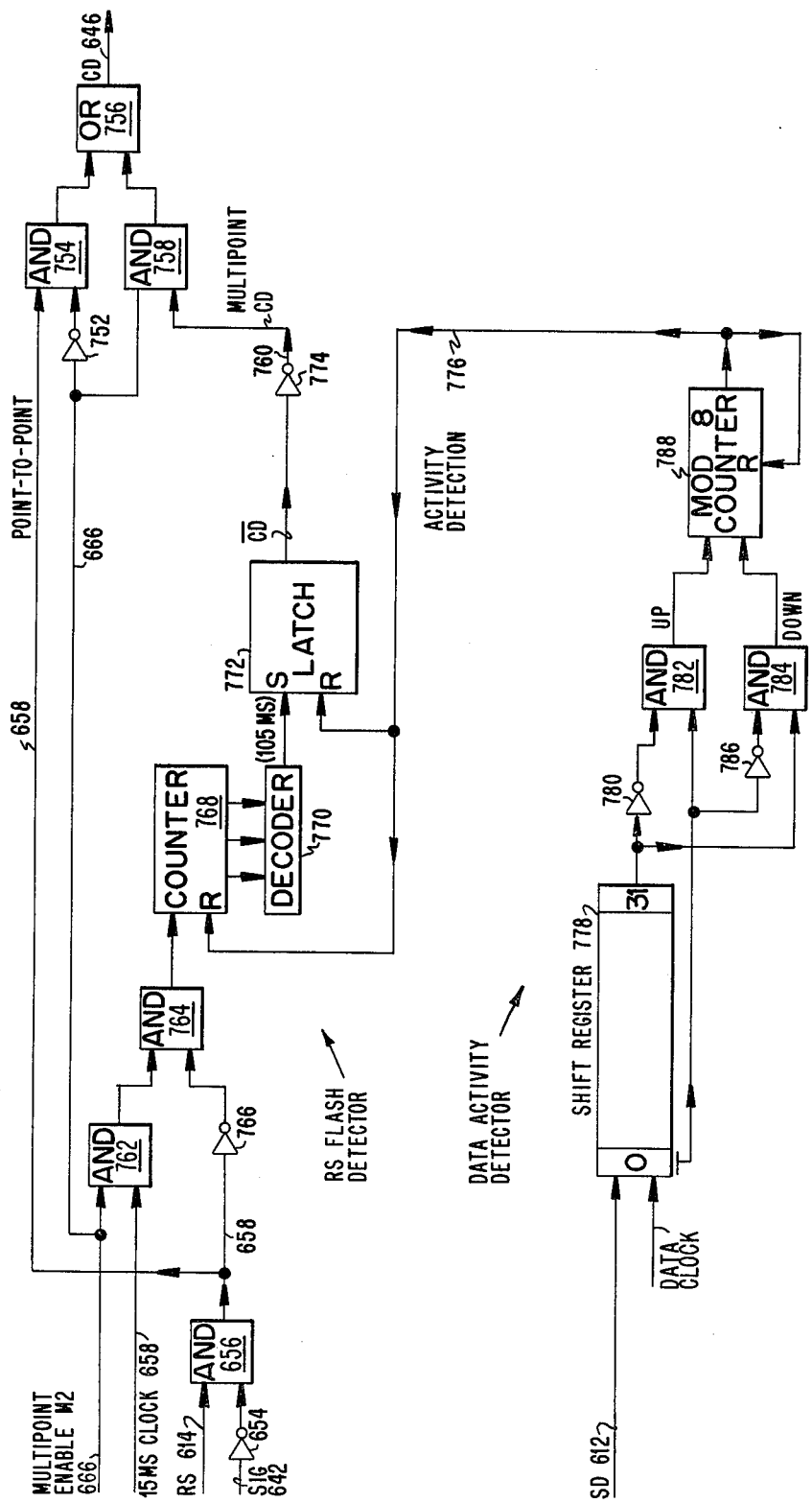
FIG. 8 is a detailed logic diagram of the activity detector in the switching logic of FIG. 4.
Figure 11:
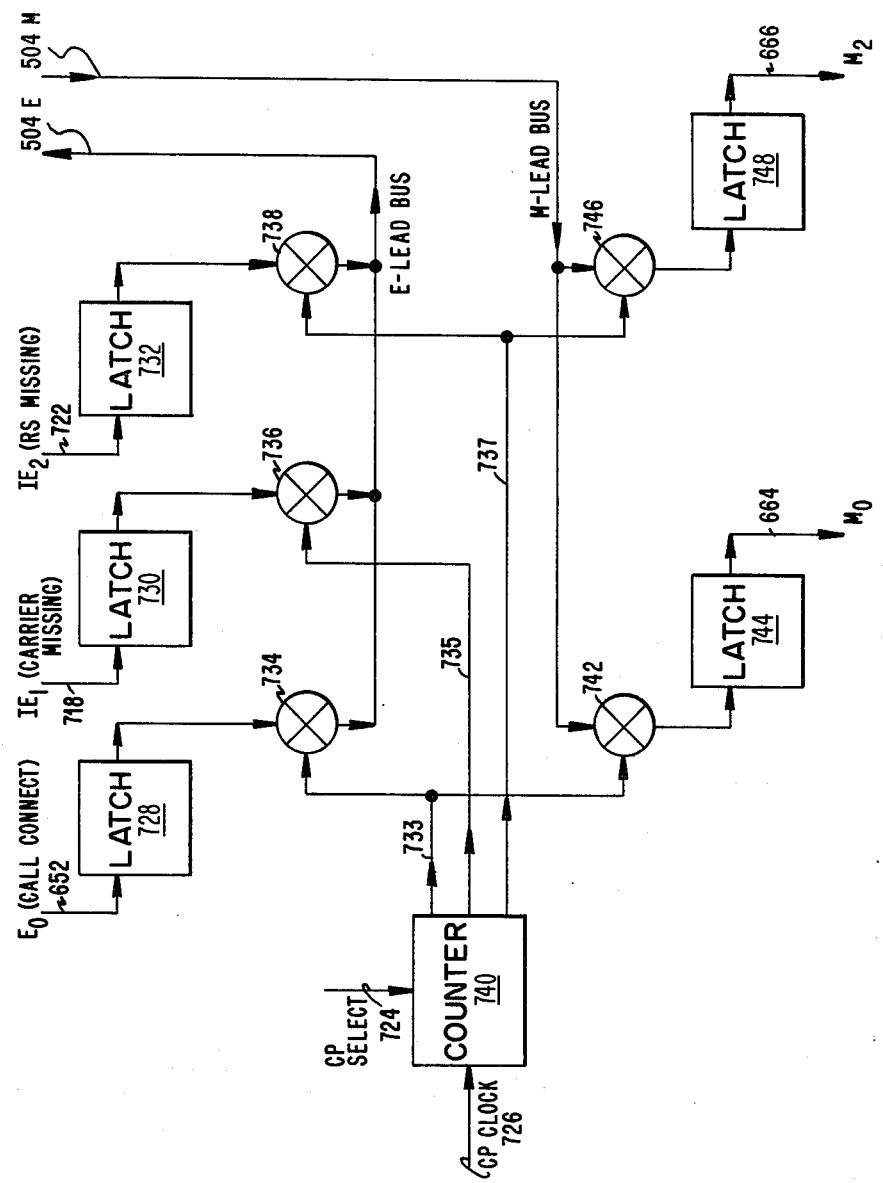
FIG. 11 is a detailed logic diagram showing the call processor interface.

The second embodiment of the switching logic 626, shown in FIG. 4, differs from the first embodiment shown in FIG. 10, by the addition of the port activity detector 660, shown in greater detail in FIG. 8, and the call processor interface 650, shown in greater detail in FIG. 11.

A modem carrier input line 714 comes from a modem attached to the RS-449 interface 648, and would be used in those circumstances where there is a relatively long distance from the switching adaptor 602 to the data port 21, requiring the use of modems between the switching adaptor 602 and the data port 21 which transmit data or control information over the communication link therebetween with a carrier signal. The carrier signal can be locally detected in any conventional manner and output on line 714 to the modem carrier detector 716 shown in FIG. 4. If the modem carrier signal is missing on line 714, a carrier missing signal is output on line 718 to the call processor interface 650. Alternately, if the request-to-send (RS) signal on line 614 is missing, that omission will be detected by the RS signal detector 720, which will output an RS missing signal on line 722 which is input to the call processor interface 650.

In the embodiment shown in FIG. 4, the output of the first OR gate 620 is the line 652 which is directed into the call processor interface 650, instead of being directed into the call processor 28 itself, as the E lead input 504E, as was described in connection with the first embodiment of FIG. 10.

The M lead output 504M from the call processor 28 is directed into the call processor interface 650. An M0 output line 664 from the call processor interface 650 is connected to the AND gate 668 and the AND gate 762, instead of the direct connection of the M lead 504M, as was described for the first embodiment in FIG. 10.

A multipoint enable line 666 carries the M2 signal from the call processor interface 650 to the port activity detector 660.

A call processor select line 724 and a call processor clock line 726 are output from the call processor 28 to the call processor interface 650.

The output line 658 from the second AND gate 656 is input to the port activity detector 660, along with a 15 millisecond clock line 680. The port activity detector 660 outputs a port carrier activity detect signal on line 646.

As was described in the above-referenced N. F. Brickman, et al. patent application, the call processor 28 can be connected to up to 96 voice ports in the communications controller 22. The E lead connection from the call processor 28 to the voice ports is over a time division multiplexed E lead bus which is divided into 96 consecutive slots or time intervals. An individual select line 724 is connected between the call processor 28 and each respective voice port so as to identify to the voice port the time interval on the E lead bus allocated to that voice port. In a similar manner, the M lead connection 504M from the call processor 28 to the 96 voice ports is by means of a time division multiplexed M lead bus. The select interval for a particular port is the same for both the M lead and the E lead. Since the port status buffer in the call processor 28 scans these 96 voice ports once every five milliseconds, a 52 microsecond interval is allocated to each voice port during each port status buffer scan. This operation is illustrated in FIG. 6, which shows a timing diagram for a port select signal on line 724 juxtaposed with a timing diagram for the 52 microsecond repetition rate call processor clock line 726 and the corresponding sequence of intervals on the M lead bus 504M and intervals on the E lead bus 504E. In the in-band signaling apparatus disclosed herein, a data port is substituted for three voice ports as described in the above-referenced N. F. Brickman, et al. patent application. Thus each data port has available to it three consecutive E lead slots or time intervals on the E lead bus 504E and three consecutive M lead slots or time intervals on the M lead bus 504M. In the first embodiment shown in FIG. 10 for the in-band signaling apparatus, only a single E lead interval would be necessary in order to conduct the control communications for the call connection, as previously described. However, in the embodiment shown in FIG. 4, the in-band signaling apparatus can be applied to the conduction of additional control signals or status signals indicating error conditions at the data terminal equipment or at a modem connecting the data terminal equipment 600 to the data port 21. These control and status signals can then be substituted for E lead-type signals and can be inserted into one of the three E lead intervals on the E lead bus 504E, which would not be otherwise used for the conventional call connection signals to the call processor 28. By the same token, the additional M lead slots from the call processor 28 to the data port 21 will enable additional control communication from the call processor 28 or the control processor 32 to the selected data port. In particular, if it is desired to conduct multipoint communication, the data port can be selectively controlled by the control processor 32 to operate in a point-to-point mode or in a multipoint mode. This selective control can be carried out in one of the three M lead slots on the M lead bus 504M which can be employed to communicate this control information to the data port from the control processor 32, and which would not otherwise be used for a conventional call connection communications.

Reference can now be made to FIG. 11 which is a detailed illustration of the call processor interface 650 used in the second embodiment of the switching logic 626 of FIG. 4. A mod 3 counter 740 is reset by the control processor select line 724, and is indexed by the control processor clock line 726 at 52 microsecond intervals so as to sequentially output enabling signals on lines 733, 735, and 737 as the counter 740 is stepped by the clock line 726. The counter 740 is then reset to zero at the next time when the call processor select line 724 is selected by the call processor. The counter 740 includes a decoder to provide the gate control signals on lines 733, 735 and 737.

Line 652 from the OR gate 620 is input to a first latch 728. The output of the first latch 728 passes through a gate 734 which is enabled by line 733 from the counter 740. The output of the gate 734 is input to the E lead bus 504E.

Line 718 from the modem carrier detector 716 is input to a second latch 730. The output of the second latch 730 is input to the gate 736 which is enabled by the line 735 from the counter 740. The output of the gate 736 is input to the E lead bus 504E.

Line 722 from the request-to-send (RS) line signal detector 720 is input to a third latch 732. The output of the third latch 732 is input to the gate 738, which is enabled by the line 737 from the counter 740. The output of the gate 738 is input to the E lead bus 504E.

The M lead bus 504M has an input connected to the gate 742 which is enabled by the line 738 from the counter 740. The gate 742 is output to the latch 744, whose output is the M0 line 664 which is connected to the input of the AND gate 668 and to the input of the AND gate 672.

The M lead bus 504M is also connected to the input of a gate 746, which is enabled by the line 737 from the counter 740. The output of the gate 746 is connected to the input of the latch 748, whose output is the M2 lead 666 which is the multipoint enable input to the port activity detector 660.

The gates 734, 736 and 738 connected to the E lead bus 504E, are sequentially enabled by the lines 733, 735 and 737, respectively, which are output from the counter 740. Thus, after the data port 21 has been selected by the call processor select line 724, the contents of the latches 728, 730, and 732 are sequentially output on consecutive E lead bus intervals on the E lead bus 504E, as described above, and are directed to three sequentially scanned port status buffer slots in the call processor 28. Simultaneously, the gate 742 is enabled when the gate 734 is enabled, thereby loading into the latch 744, the contents of the first M lead interval containing call connection information from the call processor 28, directed to the data port 21. Simultaneous with the enabling of the gate 738, the gate 746 is enabled, thereby outputting the contents of the M lead bus during a third M lead interval to the latch 748, loading the multipoint enable information from the call processor 28 to the data port 21.

In this manner, information in addition to the conventional call connection control information, can be conducted between the call processor 28 and the data port 21 by virtue of the call processor interface 650 in the second embodiment of the switching logic 626, shown in FIGS. 4 and 11.

As was described in the above-referenced J. A. Alvarez, et al. patent application, the digital switch 30 will permit multipoint communication between data ports or voice ports in the same communications controller 22, by allocating the same intranodal buffer space and the same transmit burst buffer space to each of the participating ports 21. In order to ensure that the primary or active port in a particular multipoint connection is heard by the inactive or secondary ports, the protocol is followed in the Alvarez, et al. application that the active port is to be the last port, as designated by the control processor 32, whose data contents are written into the shared buffer space in the transmit burst buffer and the intranodal buffer.

However, in the in-band data port switching apparatus disclosed herein, it is desired to allow the data terminal equipment 600 connected to each of the respective data ports 21, to decide in concert with all of the other data terminal equipments participating in the multipoint connection, as to which data port will serve as the active port during any portion of the multipoint communication session.

Since, in the abovereferenced J. A. Alvarez, et al. patent application, the request-to-send line 614 was employed as the carrier detect line which served to enable or disable the writing of that port's data into the allocated space in the transmit burst buffer and the intranodal buffer, and further since the request-to-send line 614 is now used in the subject in-band signaling apparatus as the effective E lead input to the call processor during a traffic portion of the session, an additional feature is incorporated into the in-band signaling apparatus disclosed herein to enable the data terminal equipment 600 to control, over the RS line 614, whether it will be writing into its allocated buffer space in the transmit burst buffer and the intranodal buffer, without having the call processor 28 interpret the inactive multipoint communication status of the data terminal equipment 600 in the multipoint network, as an on-hook condition.

This is accomplished by incorporating a flash timer 750 in the switch adaptor 602, to output through the call control logic 700, a 105 millisecond duration down level pulse on the RS line 614, when the switch adaptor 602 receives from the data terminal equipment 600, a signal indicating that the data terminal 600 wishes to enter into the inactive state in its multipoint network. The port activity detector 660 shown in FIGS. 4 and 8, can distinguish the 105 millisecond flash on the RS line 614, from an on-hook signal, which is a down level pulse of a duration greater than 150 milliseconds which is output from the switching adaptor 602 when the DTE 600 signals that it does in fact want to go on-hook.

The port activity detector is shown in greater in FIG. 8. The function of the port activity detector 660 is to provide a carrier activity detect signal output on line 646 to the transmit burst buffer 54 and the intranodal buffer 56, shown in FIG. 9, so as to enable writing the data output from the data port 21 on the transmit bus 44A, when the carrier activity detect line 646 is up.

The port activity detector 660 shown in FIG. 8 applies the multipoint enable signal M2 on line 666 to the inverter 752, whose output is a first input to the AND gate 754. A second input to the AND gate 754 is the output on line 658 from the AND gate 656, which is the RS signal on line 614 during the traffic portion of the session when the signaling bit SIG on line 642 is down. The AND gate 754 is satisfied when the multipoint enable signal on line 666 is down, indicating that point-to-point communication is to be conducted. In point-to-point communication, the RS line 614 is mapped onto the carrier activity detect CD line 646 through the OR gate 756. Thus, if point-to-point communication is to take place, whenever the RS line is up to the data port 21, the carrier activity detect CD line 646 will be up and the transmit burst buffer 54 and intranodal buffer 56 will write the data output from the data port on the transmit bus 44A into the assigned buffer locations.

When the multipoint enable signal M2 on line 666 is high, indicating that the control processor 32 wants the data port 21 to engage in a multipoint communication session, the AND gate 754 is not satisfied. However the line 666 is also one input to the AND gate 658, whose other input 760 is connected to the circuitry shown in FIG. 8 for establishing a multipoint activity detection signal, which is generated as follows.

After the call connection has been established as previously described, the RS line 614 is up and the signaling bit on line 642 is down, thereby satisfying the AND gate 656 which outputs a high level on line 658 which is inverted in the inverter 766 so that a low level is applied to one input of the AND gate 764. If the DTE 600 has agreed through its protocol with other DTE's connected to other data ports either in the local SCC 22 or in remote SCC's, that the data port 21 will be the active port in the multipoint mode, then the RS line 614 will remain high and the AND gate 764 will block input from the AND gate 762.

Data activity on the send data line 612 is detected by the shift register 778 which is a 32-bit shift register. Activity on the send data line 612 is defined as the condition where there are at least eight zero bits in any 32-bit sequence received on the SD line 612. This condition is detected by connecting a first input of the AND gate 782 to the zero bit position of the shift register 778 and a second input of the AND gate 782 through the inverter 780 to the 31st bit position of the shift register 778. The AND gate 782 will be incremented every time a zero is entered into the shift register 778 and a one-bit exits from the shift register. The output of the AND gate 782 is input to the increment input of the modulo 8 up/down counter 788. The zero bit position of the shift register 778 is passed through the inverter 786 to a first input of the AND gate 784, the second input of which is connected to the 31st bit position of the shift register. Whenever a one bit enters the shift register 778 and a zero bit exits from the shift register, the AND gate 784 is satisfied and provides a decrement signal to the decrement input of the modulo 8 up/down counter 788. When the counter 788 counts eight zeros being present in the 32-bit shift register 778, an activity detect signal is output on line 776 which is applied to the reset terminal of the latch 772. The modulo 8 counter 788 is also reset by the output on line 776. The output of the latch 772 is the complement of the multipoint activity detection signal, which is inverted in the inverter 774 and output on the line 760 to the AND gate 758. When the latch 772 is reset by the line 776 when activity has been detected in the multipoint mode, the output of the latch 772 is down and thus the output of the inverter 774 is up, thereby satisfying the AND gate 758 when the multipoint enable signal M2 on line 666 is up. Thus the up level signal on line 760 is passed through the OR gate 756 as the carrier activity detect signal on line 646 to the transmit burst buffer 54 and the intranodal buffer 56, as described above.

In this manner, during multipoint communication, when the local DTE 600 is designated by mutual agreement with other DTE's, as the active, broadcasting data port in the multipoint session, the carrier activity detect CD line 646 will be up. This will enable the data output from the data port 21 on the transmit bus 44A to be loaded into the transmit burst buffer 54 and the intranodal buffer 56, in preference to other local data ports in the local SCC 22, whose respective DTE's are in a passive mode in the multipoint session and which share the same buffer partition in the transmit burst buffer 54 and the intranodal buffer 56.

When the DTE 600 connected through the switching adaptor 602 to the data port 21, determines, autonomously of the control processor 32, that it wishes to relinquish its role as the active participant in the multipoint session, the DTE 600 raises a control signaling line to the switching adaptor 602 indicating that it wishes to terminate that active role in the multipoint session but that it also wishes to retain its off-hook status. The call control logic 700 in the switching adaptor 602 of FIG. 2 then causes the flash timer 750 to transmit a 105 millisecond down level flash on the RS line 614 to the data port 21. This momentarily dissatisfies the AND gate 656, causing the inverter 766 in FIG. 8 to apply an up level pulse for the 105 millisecond duration to the AND gate 764.

The AND gate 762 has a first input connected to the multipoint enable signal M2 line 666 which is in an up level, and has a second input connected to a 15 millisecond clock line 658. Thus, for the 105 millisecond duration of the up level pulse output from the inverter 766 to the first input of the AND gate 764, seven of the 15 millisecond clock pulses input on the lines 658 will be applied through the AND gate 762 and through the AND gate 764 to the input of the counter 768. The counter 768 was previously reset by the activity detect line 776. The counter 768 will count seven of the 15 millisecond clock pulses, which will be decoded by the decoder 770. If a longer duration down level pulse on the RS line 614 were to occur, the decoder would be able to distinguish the longer pulse from the 105 millisecond flash. The 105 millisecond flash is of a short enough duration such that the call processor 28 will not recognize the signal as a valid E lead on-hook signal on line 504E. When the decoder 770 recognizes a 105 millisecond RS flash, it outputs an enabling signal to the set input of the latch 772 which provides an up level output to the latch. This up level output is inverted by the inverter 774, providing a down level for the multipoint activity detection signal on line 760, applied to the AND gate 758. This dissatisfies the AND gate 758, which effectively turns off the carrier activity detect signal CD on line 646. The down level for the carrier activity detect signal on line 646 prevents any data output from the data port 21 from being written into the transmit burst buffer 54 or intranodal buffer 56 buffer partitions which are shared with the other local data ports also participating in the multipoint session. By prior communicated multipoint control signaling, as will be described hereinafter, the local data terminal equipment 600 will have communicated to the next active DTE in the multipoint session, its designation as the next active broadcasting port. That designated next DTE will then assume its role as the active participant in the multipoint session.

When the local data terminal equipment 600, is then later reassigned its role as the active broadcasting participant in the multipoint session by another DTE in the multipoint network, the local DTE 600 will once again begin transmitting data on its SD line 612. The port activity detector 660 will detect this activity with the shift register 778, as was described above, and the activity detect line 776 will be turned on, thereby resetting the latch 772 and applying a high level signal on line 750 as the multipoint activity detect signal to the AND gate 758. This will be output through the OR gate 756 on line 646 as the carrier activity detect signal, as previously described.

In this manner, the active broadcasting status in a multipoint session can be passed between the several DTE's participating in that session under the mutually agreed to control of those DTE's, in a manner which is transparent to the communications controllers 22 themselves. Further discussion of this mobile bandwidth feature will be provided hereinafter.

Figures 3, 3A:
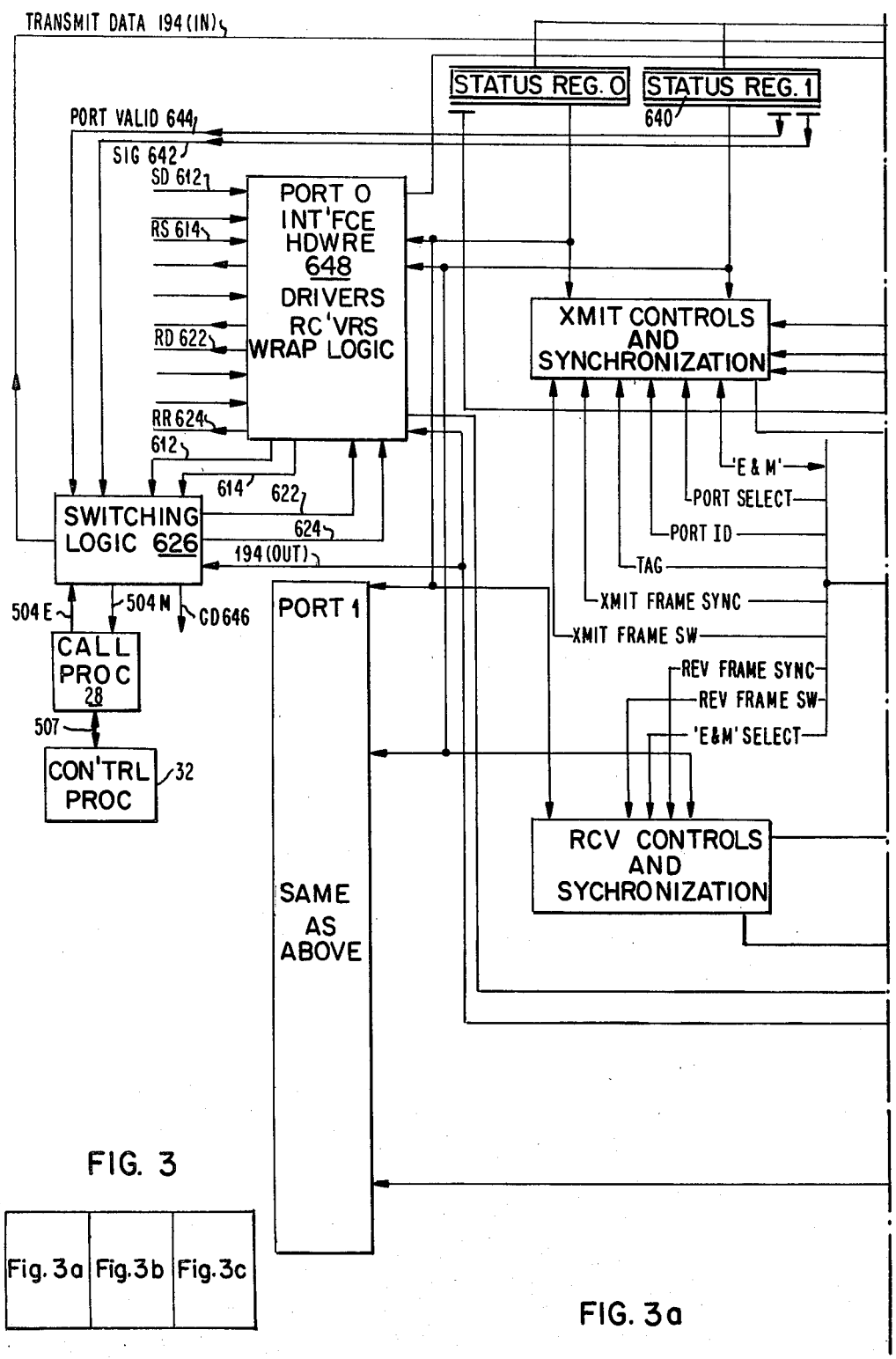
FIG. 3, including a-c, is a more detailed functional block diagram of the data port for the communications controller.
Figure 3B:
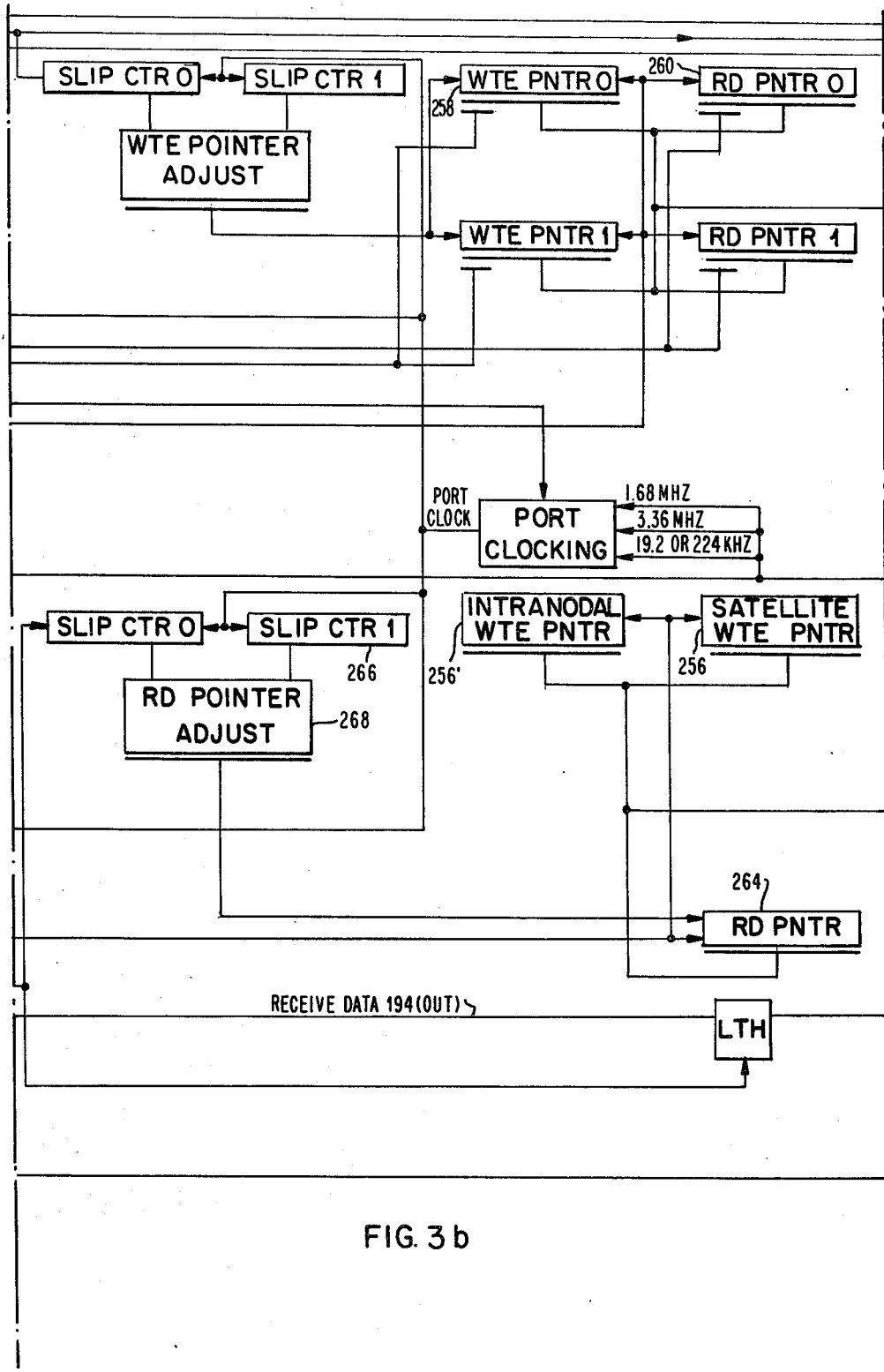
Figure 3C:
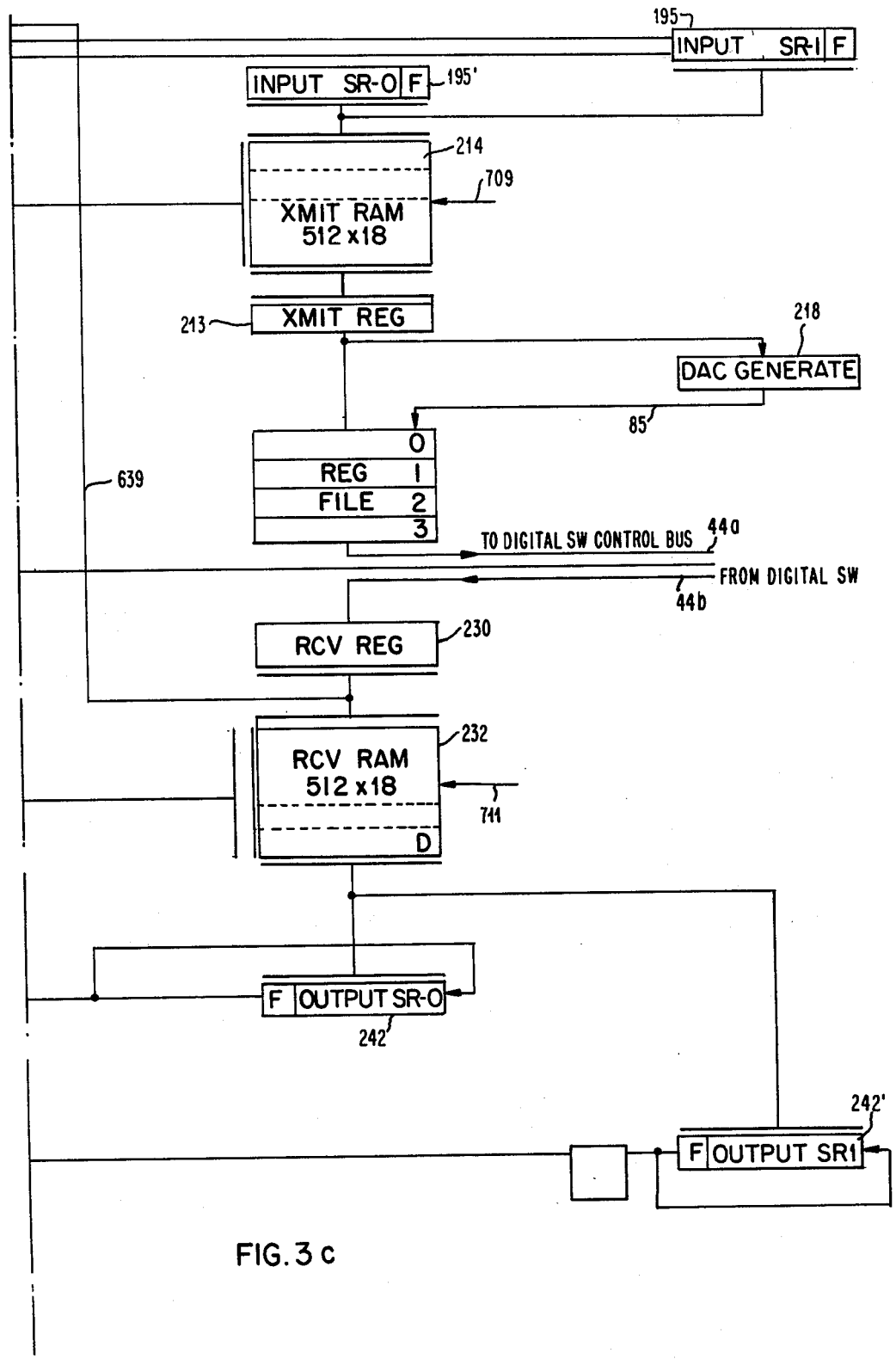
Figure 7:
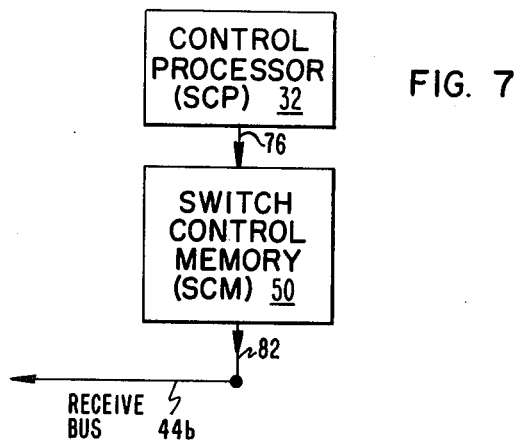
FIG. 7 is a functional block diagram of the switch control memory interconnection in the digital switch of the communications controller.

FIG. 7 illustrates the interconnection of the switch control memory 50 in the digital switch 30 of the satellite communications controller 22 so that it has the input line 76 from the satellite communications processor 32 and it has its output line 82 connected to the receive bus 44B which is the data bus to the port 21. With this connection, the satellite communications processor 32 can transfer status words over line 76 through the SCM 50 and over the line 82 to the receive bus 44B, passing status words directly into the status register 640 over the line 639, as is shown in FIG. 3.

Figure 9:
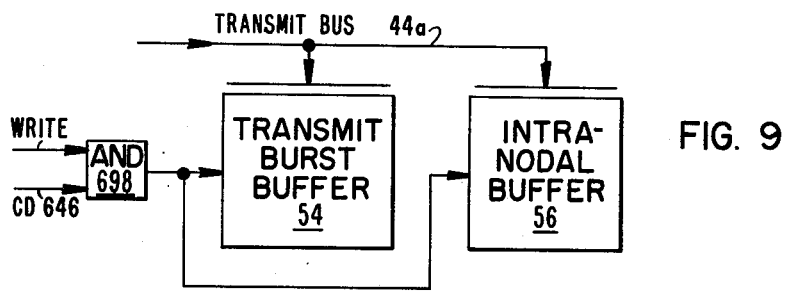
FIG. 9 is a functional block diagram of the interconnection of the transmit burst buffer and the intranodal buffer in the digital switch of the communications controller.

FIG. 9 illustrates how the carrier activity detect line 646 serves to enable the writing of data output on the transmit bus 44A into the transmit burst buffer (TBB) 54 and the intranodal buffer (INB) 56 of the digital switch 30 in the satellite communications controller 22. The write control line serves as one input to the AND gate 698, the other input of which is the carrier activity detect line 646 from the respective port being selected by the switch control memory 50, as has been described previously in the N. F. Brickman, et al. patent application cited above. The output of the AND gate 698 is applied as the write enable signal to the transmit burst buffer 54 and the intranodal buffer 56 during the interval when the channel of data from the data port 21 is present on the transmit bus 44A. If the port activity detector 660 in the data port 21 determines that the carrier activity detect line 646 should be off, then the data present on the transmit bus 44A will not be written into the corresponding location in the TBB 54 and the INB 56.

Description of the Operation of the Invention

Figure 5B:
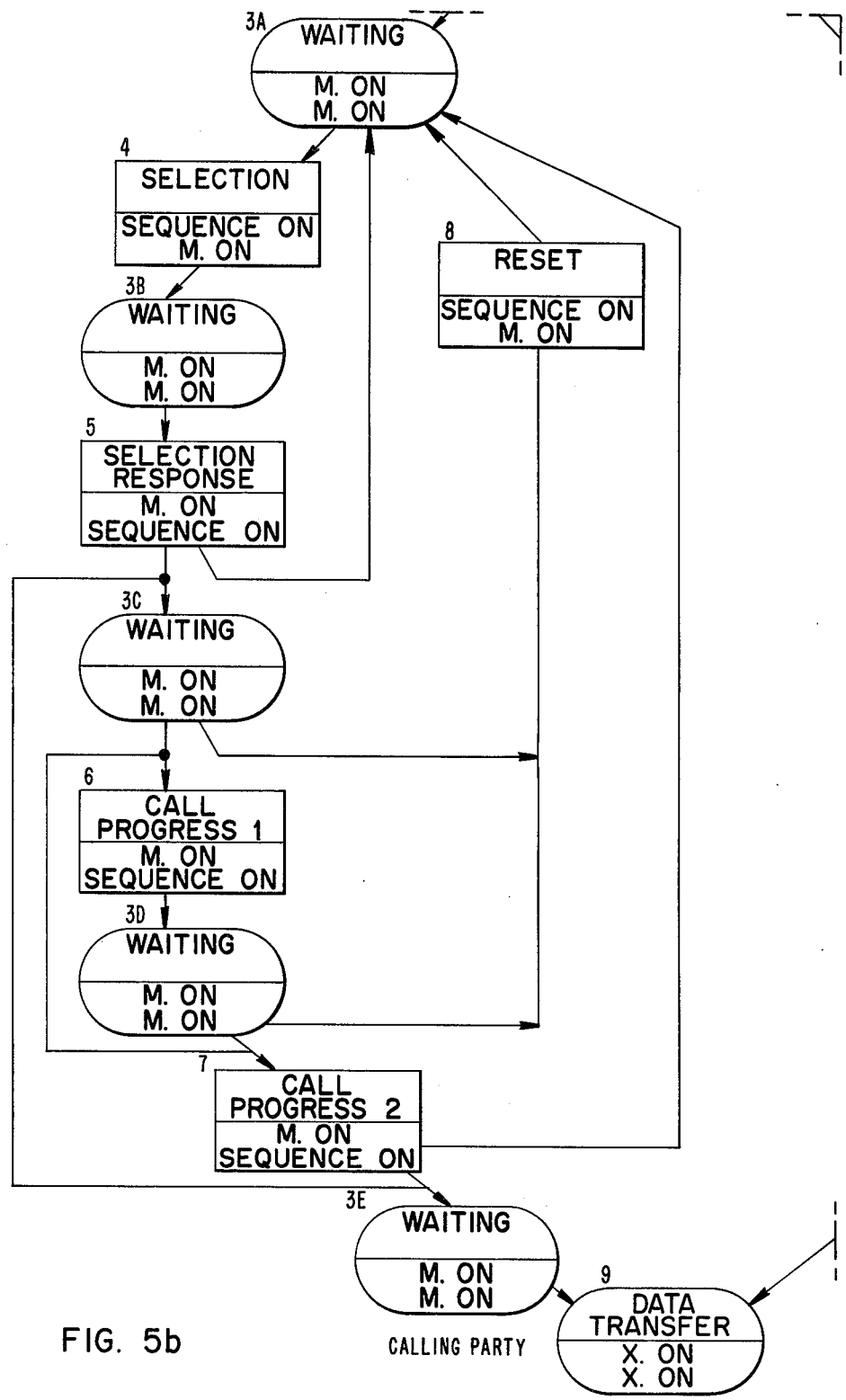
FIG. 5, including a-c, is a state diagram of the sequence of operative states for establishing a call connection in the self-switched in-band signaling communication apparatus.
Figure 5C:
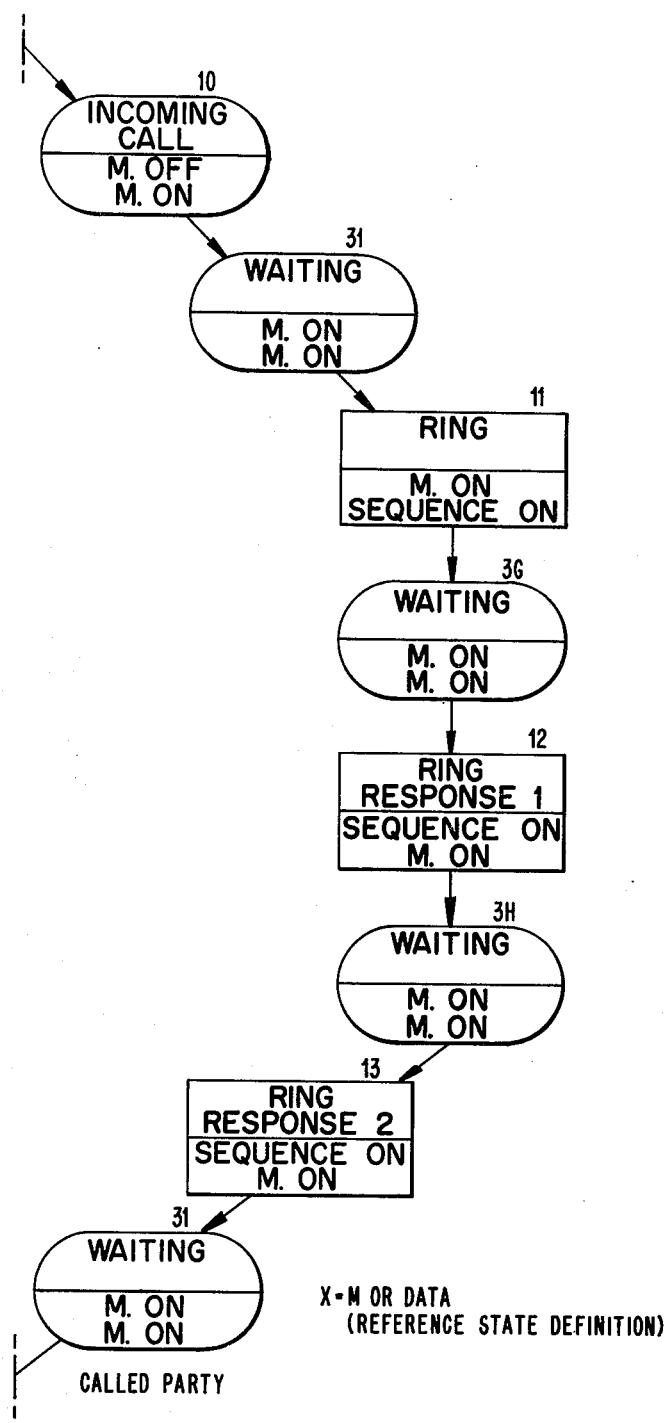

The operation of the self-switched in-band signaling communication apparatus is best illustrated with the state diagram of FIG. 5. In FIG. 5, each state is represented by an enclosed symbol, the upper half indicating the state name and the lower half indicating the condition of the SD line 612, the RS line 614, the RD line 622 and the RR line 624.

State 1 is the idle state during which a low level DC marker signal is transmitted from the DTE 600 through the switching adaptor 602 onto the SD line 612 and a low level DC marker signal is sent over the RR line 624 from the data port 21 to the switching adaptor 602. Both the RS line 614 and the RR line 624 are off. This indicates that the data terminal equipment 600 is in the idle state and that the data port 21 does not have any messages to send to it.

When the data terminal equipment 600 desires to transmit a message via the satellite communications controller 22 to another data port either locally connected intranodally at the local SCC 22 or via the satellite transponder to a remote SCC, a data terminal ready signal is transmitted from the DTE 600 to the switching adaptor 602 over the line 604. Switching adaptor 602 responds by sending a receive line signal detect signal to the DTE 600 over line 606. The DTE 600 then responds to the switching adaptor 602 by sending to it a request-to-send signal. At this point the switching adaptor 602 will output on the RS line 614 a request to send signal to the data port 21. This changes the state of the system from the idle state 1 to the call request state 2 in FIG. 5.

During the idle state 1, the status register 640 in the data port 21 will have a zero bit in the signaling bit position which, when passed over line 642 and through the inverter 654, will apply a binary one to the first input of the AND gate 656. However, since the request to send line RS 614 is off, both the AND gate 656 and the AND gate 616 are off and therefore the E0 output on line 652 is off.

When the request to send (RS) line 614 goes on in the transition from state 1 to state 2, the AND gate 656 is satisfied and outputs a signal through the OR gate 620 as an E0 signal on line 652 to the call processor interface 650. This E0 value is interpreted as an off-hook signal on the E lead and is passed over line 504E to the call processor 28. The call processor 28 was described in detail in the above-referenced N. F. Brickman, et al. patent application. The call processor 28 communicates connect and disconnect information as well as address signaling between the E lead line 504E and the M lead line 504M and the SCP 32 which executes a call processor program. As pertinent information is collected from the CP interface 650, the call processor 28 intermittently interrupts the SCP 32 and passes data. The call processor 28 then reacts to commands from the SCP 32 by providing signaling and address information to the M lead 504. In telephone terminology, the two conditions of most importance may be broadly described as on-hook and off-hook with normal on-hook supervisory signals always being conveyed to and from the call processor on the E and M signaling leads 504. Address signals are used chiefly to carry the information which directs the establishment of a particular desired connection. This consists of the called office code and telephone number as well as auxiliary information digits. Address signaling is conveyed to and from the call processor on the E and M signaling leads 504 in the conventional rotary dial pulse addressing mode.

The SCC 22, one data port 21 takes the place of either three or six voice ports as are described in the above-referenced N. F. Brickman, et al. patent application. Thus for each data port there are at least three time multiplexed E lead input slots from the data port to the call processor and at least three time multiplexed M lead output slots from the call processor to the data port, as previously described. Each of the three available E lead slots on bus 504E and each of the available three M lead slots on bus 504M are used for different purposes in transferring call connection signaling information from the data port 21 to the call processor 28. The first E lead is used to carry out both line seizure and dialing signals. The first M lead is not used. The second E lead is not used and the second M lead is used to carry line seizure and signaling information. The third E lead is used to carry interface errors and the third M lead is not used.

During the call request state 2, the satellite communications processor 32 takes the call request information from the call processor 28 and correlates the requesting data port 21 with previously stored information as to the data port's speed, its intended operation in point-to-point or multipoint connections, etc. and ascertains through a demand assignment routine, whether sufficient surplus channels are available to assign to the data port 21. If sufficient channels are available, the satellite communications processor 32 communicates with the status register 640 in the data port 21, loading a status word which includes a port valid bit and a signaling bit. As was described in the above-referenced N. F. Brickman, et al. patent application, there are 36 SCM words in the switch control memory (SCM) 50 in the digital switch 30 of the satellite communications controller 22, which are set aside to provide the satellite communications processor (SCP) 32 with an opportunity to pass control information to the data port 21. Six of these 36 SCM entries are set aside in order that the SCP 32 can transfer a byte of control information referred to as status, to a specific port 21, by transferring the status word over the line 76 to the SCM 50, which in turn outputs the status word over the line 82 to the receive bus 44B. The status word then arrives at the data port 21 and is conducted over the line 639 to the status register 640. At this time, the SCM 50 can also start selecting the data port 21 even though at that instant no data is actually ready to be transmitted. The interval between the time that the data port 21 is validated and the time that data will be ready for transmission over the transmit bus 44A will be relatively short.

With the signaling bit in the status register 640 now being a binary one, the inverter 654 then disables the AND gate 656 so that E0 output on line 652 goes off. Now any subsequent modulation of the SD line 612 will be passed through as an E lead signal on line 652. Since both the signal bit and the port valid are binary ones, the AND gate 676 is satisfied and will output an RR signal on line 624. As is seen from the state diagram of FIG. 5, when the RR line 624 goes on, the state of the system transfers from the call request state 2 to the waiting state 3A.

In the waiting state 3A, the switch adaptor 602 transfers the RR signal on line 624 to the data terminal equipment 600, which signals to the DTE that it is permitted to start sending selection signals over the control line 608 to the switch adaptor 602. The DTE 600 then transmits over the control line 608 one or more bytes of information indicating the call destination address and other control information. The switch adaptor 602 then performs a parallel-to-serial conversion of this control information and inputs it to the auto dialer 630 which, in turn, generates a serial dial pulse on the send data line 612 transmitting the call connection information to the data port 21. The transmission of the selection pulses on the SD line 612 places the system in the fourth state, as is shown in FIG. 5. The dial pulses are transmitted over the SD line 612 at a rate of approximately 16 Hz, the conventional dialing rate. Each positive going dialing pulse on the SD line 612 enables the AND gate 616 and therefore the dialing pulses are passed through the OR gate 620 as E0 signals on the line 652 to the call processor interface 650. The interface 650 transfers these dial pulses as E lead signals on the E lead 504E to the call processor 28.

After all of the dialing pulses have been transferred over the SD line 612, the system enters the waiting state 3B. During the waiting state 3B, the SCP 32 carries on the communication with the destination SCC in order to establish the call connection. If there is a busy circuit being called, this status information will be transferred back to the SCP 32, which in turn transfers this busy status to the call processor 28. The call processor 28 will then output over the M lead 504M to the CP interface 650, the busy status information. Since the M lead signal from the call processor 28 to the CP interface 650 has a duration of approximately 52 microseconds, as is described in the call processor patent application by N. F. Brickman, et al., this information must be latched by the call processor interface 650 so that conventional M lead pulses having a longer duration of on the order of 100 milliseconds can be produced. These M lead pulses are output on the M0 lead 664 to the AND gate 668. Since the signaling bit in the status register 640 is a binary one, the AND gate 668 is satisfied and therefore its output provides the M lead signals on the RD line 662 which is directed back to the switch adaptor 602. This selection response state 5 is shown in the state diagram of FIG. 5.

The system can now enter the next waiting state 3C during which time the switch adaptor 602 transfers the control information over the control line 610 to the DTE 600 and the DTE can decide whether to proceed based upon the response status signals. A sequence of transmit and response control signals represented by the states 6, 3D and 7 and 3D in FIG. 5 can be engaged in until the SCP 32 can determine that the requisite signaling has been completed.

At this time, the SCP 32 transfers over line 76 to the SCM 50 a status word having the signaling bit off. This status word is transferred out of the SCM 50 over the line 82 to the receive bus 44B and, as previously described, this status word is transferred over the line 639 in the selected data port to the status register 640. When the signaling bit in the status register 640 is a binary zero, the AND gate 656 is satisfied since RS is up and therefore the E0 input on line 652 remains up. This blocks any modulation of the E0 lead 652 by subsequent incoming data on the SD line. In addition, when the signaling bit in the status register 640 is a zero, the transmit RAM 214 in the data port begins to transfer the incoming data on the SD line, via line 194 (IN), to the transmit bus 44A. Thus, the switching logic 626 effectively transfers the operation of the SD line 612 from a call connection line (with the E0 line 652) to a data transmission line (with the data line 194 (IN)) and the system is now ready to engage in regular data transmission traffic.

With regard to the RD line 622, since the signal bit on line 642 is now zero, the AND gate 668 is disabled and RD will then be modulated through the AND gate 678 by the receive data line 194 (OUT) from the receive RAM 232. The receive RAM 232 begins to transfer data from the receive bus 44B when the signaling bit in the status register 640 is a zero. Thus the switching logic 626 effectively transfers the operation of the RD line 622 from a call connection line (with the M0 line 664) to a data receive line (with the data line 194 (OUT)) when the system is ready to start regular data traffic.

With the signal bit off now in the status register 640, the AND gate 676 is disabled and therefore the output on the RR line 624 will now depend upon the state of the M lead M0 on line 664 to AND gate 672 from the CP interface 650. The control processor 28 keeps the M lead line 504M up in order to keep the RR lead 624 up, as is required in the data transfer state 9, shown in FIG. 5. Since the signal bit in the status register 640 is a binary zero, the inverter 654 will thereby enable the AND gate 656 and produce an up level on the E0 lead 652 which is transferred through the CP interface 650 as an up level on the E lead 504E to the call processor 28. This is the conventional signal protocol for rotary dial pulse signals to and from a call processor where, during the traffic portion of the session, both the E lead and the M lead are up.

Data traffic transferred from the DTE 600 can now take place by outputting the serial data stream on the line 604 at data rates of from 2.4 Kbps to 1.5 Mbps which are transferred through the switch adaptor 602 to the SD line 612. In the data port, the data traffic is transferred from the SD line 612 to the data line 194 (OUT) and is loaded through the input register 195 to the transmit RAM 214. Satellite traffic transmission and intranodal traffic transmission can then take place through the digital switch 30, as is described in the above-referenced N. F. Brickman, et al. patent application.

Multipoint Communication and Mobile Bandwidth Feature

Let us first define some terms before going further:

Multidrop call: A line configuration which allows several DTE terminals on the same line.

Active port: Its request to send is up and it sends non-idle data non-switched.

Multipoint call: A data call in which the primary station can transmit data to any secondary station and in which only one secondary station can transmit data at any time.

Multiaddress call: A switched multipoint data call.

Data conference call: A multiaddress call in which a single arbitrary secondary can transmit data to any other secondary.

Generally speaking, in the prior art, no greater connectivity for data existed beyond the multiaddress call. The received line signal detector was mapped to the carrier bit. If the carrier bit was on, the communications controller reads the byte coming from a data set. If several ports had their carrier detect on, the last one in the reading list would override all the others. If no port had its carrier bit on, the first port will be read. These two last cases correspond to abnormal conditions, i.e. more than one port with carrier detect up or no port with carrier detect up.

Normally, before dropping its request to send signal a terminal has gone inactive and has sent a series of idle characters. In most data protocols, this idle character is a string of ones. In SDLC/HDLC this idle character is a string of "flags" 01111110. When a terminal goes to inactive but has not dropped its request to send, the SCC 22 detects the inactivity status by comparing the sequence of bytes received. When 60 identical bytes have been received, the port is declared to be inactive and the data activity compression (DAC) bit 85 is switched on; at that time no space allocation is reserved for this data port.

If a port detects a carrier drop from a terminal, the port will be placed in an inactive status and it will be DAC'ed.

In summary in the prior art, a terminal which is a member of a multiaddress call has its carrier detect bit up only when it has some message to transmit. Its activity is detected by comparing successive bytes to create DAC bits. This is explained in more detail in the J. A. Alvarez, et al. patent application referred to above.

In contrast, in accordance with the invention, in a data conference call using in-band signaling, the request-to-send signal is equivalent to the off-hook/on-hook of a telephone set. The carrier detect which is usually the mapping of the request-to-send cannot be used anymore to monitor which port gets to transmit. All ports still part of the same in-band signaling call will see a request-to-send/receiver ready signal up and a terminal will not drop the RS and RR lines unless it has terminated the call. Thus a new means for generating the carrier detect is provided to solve that problem.

Generally speaking, detection of DTE terminal activity is related to the fact that an active terminal transmits information and that information is related to transitions from mark to space and vice versa. The characteristics of the bit pattern depend heavily on the nature of the data link and the terminals using it. For example an idle pattern of a facsimile transmission will be different from an idle pattern of an SDLC. However their common part will lie in a long series of identical characters. As previously described, the switch adaptor 602 is placed in between the satellite communications controller 22 and the data terminal equipment 600. The switch adaptor 602 receives over line 604 three signals from the DTE which are of interest: the request-to-send, the data terminal ready, and the call request. As long as the last two signals are up, the switch adaptor 602 will raise the request-to-send RS line 614 to the data port 21. When the request-to-send on line 604 from the DTE drops but the DTE does not abort the call, the switch adaptor 602 will send all mark sequences on line 612 to the data port 21. The DTE may keep its RS signal on line 604 up but sends its idle pattern such as an SDLC/HDLC flag. At that time the switch adaptor (SA) 602 will send the pattern received from the DTE to the SCC. The SCC data port 21 will not drop the carrier detect but will drop the DAC bit so that no digital switch resources are allocated to that terminal.

In case of a multiaddress call, the DTE 600 will drop its RS signal on line 604 to the SA 602. At that time the SA 602 will drop its RS signal on line 614 for calibrated duration of 105 ms, followed by an all mark pattern on line 612. At that time, the SCC data port 21, upon reception of this RS pulse and not detecting any activity in the activity detector 660 (all mark sequence) will turn off carrier detect and will place the DAC bit 85 on. The calibrated duration of the dropped interval on RS is chosen in such a way that it can be distinguished from line noise and from a true disconnect. The line noise (a relay malfunction, a high parasitic noise) will usually last a few tens of milliseconds.

A true disconnect will last more than the minimum time for the call processor 28 to detect an on-hook. Line noise is not followed by an all ones pattern because the terminal has not dropped its RS signal on line 604 and is still sending mark space transmissions.

The presence of eight spaces among 32 signal elements will indicate activity as described above. The same process takes place at the initialization of the call: the DTE raises call request, data terminal ready and request-to-send on line 604 to the switch adaptor 602. The SA 602 raises request-to-send on line 614 and starts sending strings of spaces. The SCC 22 will recognize an incoming call and will raise both the E lead 504E to the call processor 28 and the carrier detect bit 646 to the digital switch 30.

The DAC bit 85 will be on whenever carrier detect 646 is off. It will follow the normal DAC function when the carrier detect bit 646 is on. In particular, when the terminal is sending an idle pattern (such as flags of SDLC), the DAC bit 85 will be on and no digital switch resources will be allocated to that call as long as the DAC bit is on.

Thus a new means is provided to separate the activity detection from the request-to-send/receiver ready detection, allowing the latter to be reserved for on-hook/off-hook detection.

Mobile Bandwidth Function

Previously, the types of call which the SCC supported were: point-to-point, multipoint, and broadcast. In accordance with the invention, now a new type of call is supported and this is the mobile bandwidth call also called mobile broadcast. The mobile broadcast will allow a mobile source of broadcasting. In a normal broadcast call, the host and call originator will be fixed, sending its message to the broadcast-called parties. In a mobile broadcast call, the broadcast host will change from one called party to another called party under the control of the call originator. Description of the operation is as follows. Note that to ensure the absence of delay when going from one host to a new host, the TDMA reference station must allocate the bandwidth for the whole duration of the call. This bandwidth is then allocated to the new host as the host is changed.

Mobile Bandwidth Mode of Operation

Mobile bandwidth is defined as a variable broadcast source among several defined terminals. The up-going link bandwidth is allocated to the mobile bandwidth call duration. The mobile bandwidth is rejected if no available bandwidth in the SCC satellite network pool exists at the time the call is placed. The mobile bandwidth call is established by use of a special digit indicating start of special call using mobile bandwidth. The bandwidth capacity is allocated to the call ID.

The initiating SCC# sends a signaling message of the new type requesting call ID and capacity request. The TDMA reference station sends a response identifying the TDMA channel assignments. Once the assignment and capacity are obtained, the call establishment is similar to a multipoint call. Each called station goes through with the call connection process up to the connect message. When all stations have sent their connect message, the originating station goes into the data transfer mode and the data link control procedure takes place. The SCC 22 is transparent to the data once in data transfer mode. Any idle character repeated will be DAC'ed but will not be used to detect idle status of terminal and/or to detect new bandwidth allocation.

To move bandwidth to another SCC, the switch adaptor 602 flashes its request-to-send wire 614 for a duration of 105 ms so that it is distinguished from an on-hook (disconnect) signal which must be greater than 150 ms. Upon receipt of this flash through the E lead 504E of the port , the call processor 28 replies, by a flash on the M lead 504M of the same duration. The SCC places the port in signaling mode. The SA 602 dials the number of the terminal to be the next host (the term host means that broadcasting terminal at the time being considered).

Upon receipt of an acceptable number, the SCC# sends simultaneously one signaling message (of the new type) to the TDMA reference station, requesting a new assignment for mobile bandwidth and one signaling message of a conventional "attempt connect" type to the next host (to be for example SCC#1). The TDMA reference station sends the assignment number to SCC#1 (next host to be) and acknowledges the signaling message of SCC# by a response message which is an attempt response with call ID as the reference. SCC#1 checks the received assignment with the computed assignment from the demand assignment procedure. If a valid assignment is obtained, the new host SCC#1 sends a connect message to the SCC# which in turn sends a connect response to SCC#1 and a connect message to switch adaptor (SA)# (originator of call). Upon receipt of the connect response and with a valid assignment status, the SCC#1 sends a connect message to SA#1 and goes into the data transfer mode. Upon receipt of their respective connect messages, both SA# and SA#1 go into data transfer mode between their respective DTE's, DTE#1 being the only one transmitting.

To move the bandwidth to another port within the same SCC, the identical procedure will apply. Although the SCC assignment is already obtained, the identical procedure allows a uniform operation.

To move the bandwidth from the SCC#1 to an SCC#2, SA#1 will send a message to SA# indicating that it is through with its mobile bandwidth host status. SA# will either start the call disconnect procedure when the call is terminating or will initiate a new transfer of capacity to SCC#2. SCC# will at that time, simultaneously send three messages:

one to the TDMA reference station indicating the identity of the new host, one to the host in an attempt to connect message with a different content indicating that SCC#1 is to relinquish its TBB and the bandwidth for that mobile bandwidth call, and one to the new host in an attempt connect message. SCC# will then receive three message acknowledgments one from the TDMA reference station, one from the new host and one from the former host indicating the release of bandwidth. Upon receipt of these three messages, SCC# will send a connect status to SA# and send a connect message to SA#2 after having checked the computed assignment and the received assignment for that call ID from the TDMA reference station.

At the called switch adaptor level, the sequence of events from the call originator to the new host for call termination is as follows:

Receives line seizure

Acknowledges line seizure

Receives type of incoming call mobile bandwidth)

Replies to type of call by connect message or negative connect message

At that time, SA is in the data transfer mode and will receive data (but will not send). It will get from the data the message that it is going to be the next host. It should then monitor the RR line for a flash signal.

Receives flash on RR from SCC

Acknowledges flash by flash if ready to act as host

Receives ring messages from SCC as would a normally called SA which goes into the data transfer mode sending data (not receiving).

Once its message is completed and when it wants to relinquish its host status, it sends a message to the call originator switch adaptor # . This SA# flashes and goes into the procedure of moving capacity. Upon transmission of the move capacity request, the SA#2 goes into the receive mode (remains in data transfer mode as do all other switch adaptors which were not hosts). The SA may indicate to the DTE the send-only status or the receive-only status by proper indication on the appropriate wire (clear to send dropped).

The resultant self-switched in-band signaling communication apparatus achieves the above-recited objects of the invention in an improved manner.

The above-described specific embodiments can be modified in several ways. For example, the RS-232 connection lines 604 and 606 in FIG. 1 can alternately be the CCITT protocol V.35 which is a standard communications protocol defining the interface between data terminal equipment and data communication equipment. Also, for example, the switching logic 626 of FIG. 3 can serve two or more data ports as well as a single data port. Still further, for example, the call processor interface 650 of FIG. 11 can transfer a plurality of N types of diagnostic information from the interface of the data port to the call processor over N time multiplexed E lead slots, where N is greater than 3. Similarly, the call processor 28 can transfer a plurality of N types of call control functions to the data port 21 or the DTE 600 over N time multiplexed M lead slots, by increasing the counter 740 in FIG. 11 to a mod N counter.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. A self-switched data port in-band signaling apparatus for a TDMA communications controller, for selectively transferring data signals through a data port between a data terminal equipment (DTE) and a TDMA digital switch in said communications controller or transferring control signals between said DTE and a call processor in said communications controller, comprising:

a switching adaptor having a data signal input/output port connected to a data input/output port of said DTE and a control signal input/output port connected to a control input/output port of said DTE, for selectively outputting dial pulse control signals or data signals on a send data (SD) line connected thereto to said data port and outputting a request-to-send signal on a request-to-send (RS) line connected thereto to said data port in response to control signals received at said control signal input/output port from said DTE;

a first AND gate having a first input connected to said RS line and a second input connected to said SD line, and an output;

a status register having an input connected to a control processor coupled to said call processor in said communications controller, for storing a status word output therefrom including a call connection signaling bit, for indicating when said data port is alternately in a call connection state or a data traffic state;

a second AND gate having a first input connected to said RS line and a second input connected through a first inverter, to said signaling bit of said status register, and an output;

a first OR gate having a first input connected to said output of said first AND gate and having a second input connected to said output of said second AND gate and an output connected as an E lead input to said call processor;

a transmit buffer having a data input connected to said SD line, a data output connected to said digital switch, and an enabling control line connected through a second inverter to said signaling bit of said status register;

said RS line in a low state representing a quiescent state for said data port with said first and second AND gates being unsatisfied and said first OR gate maintaining said E lead input to said call processor in a low state;

said RS line entering a high state and said signaling bit being in a low state representing said DTE initiating a call request to said data port with said second AND gate being satisfied and said first OR gate raising said E lead input to said call processor to a high state;

said call processor, in response to said E lead input, transferring said call request to said control processor which then outputs a status word to said status register, raising said signaling bit to a high state;

said transmit buffer being disabled by said enabling control line in response to said high state of said signaling bit, preventing information input on said SD line from being transmitted to said digital switch;

said second AND gate becoming unsatisfied in response to said high state of said signaling bit, permitting the output from said first AND gate to modulate said E lead input to said call processor;

said SD line passing call connection dialing pulses through said first AND gate and said first OR gate as E lead input signals to said call processor;

whereby said SD line from said switch adaptor to said data port is selectively switched from a data transfer line connected to said digital switch, to an in-band call connection dial pulse control line connected to said call processor.

2. The self-switched data port in-band signaling apparatus of claim 1, which further comprises:

said switching adaptor having a receive data (RD) line connected thereto for selectively receiving dial pulse control signals or data signals from said data port of said communications controller and having a receiver ready (RR) line connected thereto for receiving receiver ready signals from said data port;

a receive buffer having a data input connected to said digital switch, a data output, and an enabling control line connected through a third inverter to said signaling bit of said status register, said receive buffer being disabled in response to said high state of said signaling bit, preventing data to be output therefrom;

a third AND gate having a first input connected to an M lead output of said call processor and a second input connected to said signaling bit of said status register, and an output, said high state of said signaling bit enabling said M lead to modulate said output of said third AND gate;

a third OR gate having a first input connected to said output of said fifth AND gate and an output connected to said RR line;

a sixth AND gate having a first input connected to said port valid bit and a second input connected to said signaling bit and an output connected as a second input to said third OR gate, for forcing said RR line into a high state during said call connection state for said data port;

whereby said RD line from said data port to said switch adaptor is selectively switched from a data transfer line connected to said digital switch, to an in-band call connection dial pulse control line connected to said call processor.

3. The self-switched data port in-band signaling apparatus of claim 2, which further comprises:

said control processor determining the completion of said call connection state for said data port and changing said signaling bit in said status register to a low state in response thereto, and further controlling said call processor to raise said M lead output to a high state in response thereto, signifying the termination of said call connection state and the commencement of said data traffic state;

a second OR gate having a first input connected to said output of said third AND gate and an output connected to said RD line;

said call processor outputting call connection dialing pulses, on said M lead which pass through said third AND gate and said second OR gate to said RD line, providing a call connection response to said switch adaptor and said DTE on said RD line during said call connection state for said data port;

said status register further including a port valid bit in said status word, for indicating that said control processor has allocated communication channels in said digital switch for use by said data port, said status output from said control processor raising said port valid bit to a high level;

a fourth AND gate having a first input connected to said port valid bit of said status register, a second input connected to said data output of said receive buffer, and a third input connected through said third inverter to said signaling bit of said status register, and an output connected to a second input of said second OR gate, said high state of said signaling bit disabling said fourth AND gate preventing said data output of said receive buffer from modulating the output of said fourth AND gate;

a fifth AND gate having a first input connected to said M lead output from said call processor, a second input connected to said port valid bit, and an output;

said sixth AND gate becoming unsatisfied in response to said low state of said signaling bit, thereby permitting said RR line output from said third OR gate to be modulated by said M lead output from said call processor through said fifth AND gate, maintaining said RR line at said high state for the duration of said data traffic state for said data port;

said receive buffer being enabled in response to said low state of said signaling bit, providing a data output from said digital switch to said fourth AND gate which is enabled by said low state of said signaling bit for the duration of said data traffic state for said data port;

said third AND gate being unsatisfied by said low state of said signaling bit, permitting said RD line output from said second OR gate to be modulated by said data output from said receive buffer for the duration of said data traffic state for said data port;

whereby said RD line from said data port to said switch adaptor is selectively switched from an in-band call connection dial pulse control line connected to said call processor, to a data transfer line connected to said digital switch.

4. The self-switched data port in-band signaling apparatus of claim 3, which further comprises:

said second AND gate being satisfied by said low state of said signaling bit, preventing data input on said SD line to pass through said first OR gate to said call processor E lead input for the duration of said data traffic state for said data port;

said transmit buffer being enabled in response to said low state of said signaling bit, providing a data input from said SD line thereto for the duration of said data traffic state for said data port;

whereby said SD line from said switch adaptor to said data port is selectively switched from an in-band call connection dial pulse control line connected to said call processor, to a data transfer line connected to said digital switch.

5. The self-switched data port in-band signaling apparatus of claim 4, which further comprises:

a call processor interface circuit connected between the output of said first OR gate and said E lead input to said call processor;

a diagnostic signal detector, having an input connected to said switching adaptor and an output connected to said call processor interface circuit, for detecting malfunctions between said switching adaptor and said data port and outputting a diagnostic signal in response thereto;

said call processor outputting a select signal and a clock signal to said call processor interface circuit for synchronizing time multiplexed E lead slots on said E lead input to said call processor;

said call processor interface circuit further comprising:

a first latch having a data input connected to said output of said first OR gate, a control input, and a gated output connected to said E lead input to said call processor, for storing said call connection dial pulse control signals received on said SD line and outputting said dial signals on said E lead in response to a signal on said control input thereto;

a second latch having a data input connected to said output of said diagnostic signal detector, a control input, and a gated output connected to said E lead input to said call processor, for storing said diagnostic signal and outputting said diagnostic signal on said E lead in response to a signal on said control input thereof;

a counter having an enabling input connected to said select signal from said call processor, and a clock input connected to said clock signal from said call processor and having a first output connected to said control input of said first latch and a second output connected to said control input of said second latch, for starting to count said clock pulses when said select signal is received from said call processor, outputting a first gating signal to said first latch to output said call connection dial pulse control signals to said E lead after a first quantity of said clock pulses is counted and outputting a second gating signal to said second latch to output said diagnostic signal to said E lead after a second quantity of said clock pulses is counted;

whereby said E lead input to said call processor transfers both call connection dial pulse control signals and diagnostic signals in a time multiplexed mode.

6. The self-switched data port in-band signaling apparatus of claim 5, which further comprises:

said select signal and said clock signal output from said call processor synchronizing time multiplexed M lead slots on said M lead output from said call processor;

said call processor interface circuit further comprising:

a third latch having a gated data input connected to said M lead output from said call processor, a control input, and an output connected to said first input of said third AND gate and to said first input of said fifth AND gate, for storing said call connection dial pulse control signals received on said M lead from said call processor in response to a signal on said control input thereof;

a fourth latch having a gated data input connected to said M lead output from said call processor, a control input, and an output connected to an auxiliary controlled device for storing auxiliary control signals received on said M lead from said call processor in response to a signal on said control input thereof;

said first output from said counter connected to said control input of said third latch and said second output from said counter connected to said control input of said fourth latch;

whereby said M lead output from said call processor transfers both call connection dial pulse control signals and auxiliary control signals in a time multiplexed mode.

7. The self-switched data port in-band signaling apparatus of claim 6, wherein said auxiliary controlled device selectively controls said digital switch for passive or alternately active participation of said DTE in a multipoint communication network or alternately for point-to-point communication of said DTE.

8. The self-switched data port in-band signaling apparatus of claim 7, wherein said auxiliary controlled device further comprises:

a first auxiliary AND gate having a first input connected through an inverter to said output of said fourth latch and a second input connected to said output of said second AND gate, and an output connected to said digital switch, for outputting an enabling signal to said digital switch when said DTE is in a point-to-point communication mode in response to receiving a low value for said auxiliary signal output from said fourth latch;

a data activity circuit having an input connected to said SD line and an output, for detecting data activity on said SD line from said DTE;

a second auxiliary AND gate having a first input connected to said output of said fourth latch and a second input connected to said data activity circuit, and an output connected to said digital switch, for selectively outputting an enabling signal to said digital switch when said DTE is in said active participation mode in said multipoint communication network, in response to receiving a high value for said auxiliary signal output from said fourth latch and detecting data activity on said SD line.

whereby said call processor can control said digital switch over said M lead, to transfer data from said data port in either said point-to-point or said multipoint communication mode.

9. The self-switched data port in-band signaling apparatus of claim 8, which further comprises:

a flash timer in said switching adaptor, having an input connected to said DTE and an output connected to said RS line, for providing a flash pulse on said RS line having a shorter duration than an on-hook signal, in response to said DTE signaling to said flash timer that it is transferring from said active participation mode to said passive participation mode in said multipoint communication network;

said data activity circuit in said auxiliary controlled device, further comprising:

a flash pulse detector having an input connected to said RS line and an output, for detecting said flash pulse on said RS line;

an auxiliary latching gate having a control input connected to said output of said flash pulse detector, a data input connected to said output of said data activity circuit, and an output connected to said second input of said second auxiliary AND gate, for preventing said outputting of said enabling signal from said second auxiliary AND gate to said digital switch when said DTE is in said passive participation mode in said multipoint communication network.

10. The self-switched data port in-band signaling apparatus of claim 9, which further comprises:

said multipoint communication network including a first plurality of said DTE's connected to respective ones of said data ports in said TDMA communications controller sharing said digital switch and a second plurality of said DTE's connected to respective ones of said data ports in remote ones of said TDMA communications controllers communicating over a TDMA link;

said DTE's in said first and second plurality mutually selecting a first one of said DTE's thereof to assume said active participation mode and the remainder of said DTE's thereof to assume said passive participation mode as a first remainder of said DTE's thereof;

the respective said second auxiliary AND gate in said first one of said DTE's selectively outputting an enabling signal to its respective said digital switch in response to receiving a high value for the respective said auxiliary signal output over the respective M lead output from its respective call processor and data activity being detected on its respective SD line;

the respective said auxiliary latching gate in each of said first remainder of said DTE's selectively preventing said outputting of the respective said enabling signal from its respective said second auxiliary AND gate to its respective said digital switch in response to its respective said flash pulse detector detecting a flash pulse over its respective said RS line;

said DTE's in said first and second plurality then mutually selecting a second one of said DTE's thereof to assume said active participation mode and the remainder of said DTE's thereof to assume said passive participation mode as a second remainder of said DTE's thereof;

the respective said second auxiliary AND gate in said second one of said DTE's selectively outputting an enabling signal to its respective said digital switch in response to receiving a high value for the respective said auxiliary signal output over the respective M lead output from its respective call processor and data activity being detected on its respective SD line;

the respective said auxiliary latching gate in each of said second remainder of said DTE's selectively preventing said outputting of the respective said enabling signal from its respective said second auxiliary AND gate to its respective said digital switch in response to its respective said flash pulse detector detecting a flash pulse over its respective said RS line;

whereby said active participation mode may be transferred between said DTE's.

11. A self-switched data port in-band signaling apparatus for a TDMA communications controller, for selectively transferring data signals through a data port between a data terminal equipment (DTE) and a TDMA digital switch in said communications controller or transferring control signals between said DTE and a call processor in said communications controller, said DTE including means for selectively outputting dial pulse control signals or data signals on a send data (SD) line connected thereto to said data port and outputting a request-to-send signal on a request-to-send (RS) line connected thereto to said data port, comprising:

a first AND gate having a first input connected to said RS line and a second input connected to said SD line, and an output;

a status register having an input connected to said call processor in said communications controller, for storing a status word output therefrom including a call connection signaling bit, for indicating when said data port is alternately in a call connection state or a data traffic state;

a second AND gate having a first input connected to said RS line and a second input connected through a first inverter, to said signaling bit of said status register, and an output;

a first OR gate having a first input connected to said output of said first AND gate and having a second input connected to said output of said second AND gate and an output connected as an E lead input to said call processor;

a transmit buffer having a data input connected to said SD line, a data output connected to said digital switch, and an enabling control line connected to said signaling bit of said status register;

said RS line in a low state representing a quiescent state for said data port with said first and second AND gates being unsatisfied and said first OR gate maintaining said E lead input to said call processor in a low state;

said RS line entering a high state and said signaling bit being in a low state representing said DTE initiating a call request to said data port with said second AND gate being satisfied and said first OR gate raising said E lead input to said call processor to a high state;

said call processor, in response to said E lead input, outputs a status word to said status register, raising said signaling bit to a high state;

said transmit buffer being disabled by said enabling control line in response to said high state of said signaling bit, preventing information input on said SD line from being transmitted to said digital switch;

said second AND gate becoming unsatisfied in response to said high state of said signaling bit, permitting the output from said first AND gate to modulate said E lead input to said call processor;

said SD line passing call connection dialing pulses through said first AND gate and said first OR gate as E lead input signals to said call processor;

whereby said SD line from said DTE to said data port is selectively switched from a data transfer line connected to said digital switch, to an in-band call connection dial pulse control line connected to said call processor.

12. The self-switched data port in-band signaling apparatus of claim 11, which further comprises:

said DTE having a receive data (RD) line connected thereto for selectively receiving dial pulse control signals or data signals from said data port of said communications controller and having a receiver ready (RR) line connected thereto for receiving receiver ready signals from said data port;

a receive buffer having a data input connected to said digital switch, a data output, and an enabling control line connected to said signaling bit of said status register, said receive buffer being disabled in response to said high state of said signaling bit, preventing data to be output therefrom;

a third AND gate having a first input connected to an M lead output of said call processor and a second input connected to said signaling bit of said status register, and an output, said high state of said signaling bit enabling said M lead to modulate said output of said third AND gate;

a second OR gate having a first input connected to said output of said third AND gate and an output connected to said RD line;

said call processor outputting call connection dialing pulses, on said M lead which pass through said third AND gate and said second OR gate to said RD line, providing a call connection response to said DTE on said RD line during said call connection state for said data port;

said status register further including a port valid bit in said status word, for indicating that said call processor has allocated communication channels in said digital switch for use by said data port, said status output from said call processor raising said port valid bit to a high level;

a fourth AND gate having a first input connected to said port valid bit of said status register, a second input connected to said data output of said receive buffer, and a third input connected through an inverter to said signaling bit of said status register, and an output connected to a second input of said second OR gate, said high state of said signaling bit disabling said fourth AND gate preventing said data output of said receive buffer from modulating the output of said fourth AND gate;

a fifth AND gate having a first input connected to said M lead output from said call processor, a second input connected to said port valid bit, and an output;

a third OR gate having a first input connected to said output of said fifth AND gate and an output connected to said RR line;

a sixth AND gate having a first input connected to said port valid bit and a second input connected to said signaling bit and an output connected as a second input to said third OR gate, for forcing said RR line into a high state during said call connection state for said data port;

whereby said RD line from said data port to said DTE is selectively switched from a data transfer line connected to said digital switch, to an in-band call connection dial pulse control line connected to said call processor.

13. The self-switched data port in-band signaling apparatus of claim 12, which further comprises:

said call processor determining the completion of said call connection state for said data port and changing said signaling bit in said status register to a low state in response thereto, and further raising said M lead output to a high state in response thereto, signifying the termination of said call connection state and the commencement of said data traffic state;

said sixth AND gate becoming unsatisfied in response to said low state of said signaling bit, thereby permitting said RR line output from said third OR gate to be modulated by said M lead output from said call processor through said fifth AND gate, maintaining said RR line at said high state for the duration of said data traffic state for said data port;

said receive buffer being enabled in response to said low state of said signaling bit, providing a data output from said digital switch to said fourth AND gate which is enabled by said low state of said signaling bit for the duration of said data traffic state for said data port;

said third AND gate being unsatisfied by said low state of said signaling bit, permitting said RD line output from said second OR gate to be modulated by said data output from said receive buffer for the duration of said data traffic state for said data port;

whereby said RD line from said data port to said DTE is selectively switched from an in-band call connection dial pulse control line connected to said call processor, to a data transfer line connected to said digital switch.

14. The self-switched data port in-band signaling apparatus of claim 13, which further comprises:

said second AND gate being satisfied by said low state of said signaling bit, preventing data input on said SD line to pass through said first OR gate to said call processor E lead input for the duration of said data traffic state for said data port;

said transmit buffer being enabled in response to said low state of said signaling bit, providing a data input from said SD line thereto for the duration of said data traffic state for said data port;

whereby said SD line from said DTE to said data port is selectively switched from an in-band call connection dial pulse control line connected to said call processor, to a data transfer line connected to said digital switch.

15. The self-switched data port in-band signaling apparatus of claim 14, which further comprises:

a call processor interface circuit connected between the output of said first OR gate and said E lead input to said call processor;

a diagnostic signal detector, having an input connected to said DTE and an output connected to said call processor interface circuit, for detecting malfunctions between said DTE and said data port and outputting a diagnostic signal in response thereto;

said call processor outputting a select signal and a clock signal to said call processor interface circuit for synchronizing time multiplexed E lead slots on said E lead input to said call processor;

said call processor interface circuit further comprising:

a first latch having a data input connected to said output of said first OR gate, a control input, and a gated output connected to said E lead input to said call processor, for storing said call connection dial pulse control signals received on said SD line and outputting said dial signals on said E lead in response to a signal on said control input thereto;

a second latch having a data input connected to said output of said diagnostic signal detector, a control input, and a gated output connected to said E lead input to said call processor, for storing said diagnostic signal and outputting said diagnostic signal on said E lead in response to a signal on said control input thereof;

a counter having an enabling input connected to said select signal from said call processor, and a clock input connected to said clock signal from said call processor and having a first output connected to said control input of said first latch and a second output connected to said control input of said second latch, for starting to count said clock pulses when said select signal is received from said call processor, outputting a first gating signal to said first latch to output said call connection dial pulse control signals to said E lead after a first quantity of said clock pulses is counted and outputting a second gating signal to said second latch to output said diagnostic signal to said E lead after a second quantity of said clock pulses is counted;

whereby said E lead input to said call processor transfers both call connection dial pulse control signals and diagnostic signals in a time multiplexed mode.

16. The self-switched data port in-band signaling apparatus of claim 15, which further comprises:

said select signal and said clock signal output from said call processor synchronizing time multiplexed M lead slots on said M lead output from said call processor;

said call processor interface circuit further comprising:

a third latch having a gated data input connected to said M lead output from said call processor, a control input, and an output connected to said first input of said third AND gate and to said first input of said fifth AND gate, for storing said call connection dial pulse control signals received on said M lead from said call processor in response to a signal on said control input thereof;

a fourth latch having a gated data input connected to said M lead output from said call processor, a control input, and an output connected to an auxiliary controlled device for storing auxiliary control signals received on said M lead from said call processor in response to a signal on said control input thereof;

said first output from said counter connected to said control input of said third latch and said second output from said counter connected to said control input of said fourth latch;

whereby said M lead output from said call processor transfers both call connection dial pulse control signals and auxiliary control signals in a time multiplexed mode.

17. The self-switched data port in-band signaling apparatus of claim 16, wherein said auxiliary controlled device selectively controls said digital switch for passive or alternately active participation of said DTE in a multipoint communication network or alternately for point-to-point communication of said DTE.

18. The self-switched data port in-band signaling apparatus of claim 17, wherein said auxiliary controlled device further comprises:

a first auxiliary AND gate having a first input connected through an inverter to said output of said fourth latch and a second input connected to said output of said second AND gate, and an output connected to said digital switch, for outputting an enabling signal to said digital switch when said DTE is in a point-to-point communication mode in response to receiving a low value for said auxiliary signal output from said fourth latch;

a data activity circuit having an input connected to said SD line and an output, for detecting data activity on said SD line from said DTE;

a second auxiliary AND gate having a first input connected to said output of said fourth latch and a second input connected to said data activity circuit, and an output connected to said digital switch, for selectively outputting an enabling signal to said digital switch when said DTE is in said active participation mode in said multipoint communication network, in response to receiving a high value for said auxiliary signal output from said fourth latch and detecting data activity on said SD line;

whereby said call processor can control said digital switch over said M lead, to transfer data from said data port in either said point-to-point or said multipoint communication mode.

19. The self-switched data port in-band signaling apparatus of claim 18, which further comprises:

a flash timer in said DTE having an output connected to said RS line, for providing a flash pulse on said RS line having a shorter duration than an on-hook signal, in response to said DTE signaling to said flash timer that it is transferring from said active participation mode to said passive participation mode in said multipoint communication network;

said data activity circuit in said auxiliary controlled device, further comprising:

a flash pulse detector having an input connected to said RS line and an output, for detecting said flash pulse on said RS line;

an auxiliary latching gate having a control input connected to said output of said flash pulse detector, a data input connected to said output of said data activity circuit, and an output connected to said second input of said second auxiliary AND gate, for preventing said outputting of said enabling signal from said second auxiliary AND gate to said digital switch when said DTE is in said passive participation mode in said multipoint communication network.

20. The self-switched data port in-band signaling apparatus of claim 19, which further comprises:

said multipoint communication network including a first plurality of said DTE's connected to respective ones of said data ports in said TDMA communications controller sharing said digital switch and a second plurality of said DTE's connected to respective ones of said data ports in remote ones of said TDMA communications controllers communicating over a TDMA link;

said DTE's in said first and second plurality mutually selecting a first one of said DTE's thereof to assume said active participation mode and the remainder of said DTE's thereof to assume said passive participation mode as a first remainder of said DTE's thereof;

the respective said second auxiliary AND gate in said first one of said DTE's selectively outputting an enabling signal to its respective said digital switch in response to receiving a high value for the respective said auxiliary signal output over the respective M lead output from its respective call processor and data activity being detected on its respective SD line;

the respective said auxiliary latching gate in each of said first remainder of said DTE's selectively preventing said outputting of the respective said enabling signal from its respective said second auxiliary AND gate to its respective said digital switch in response to its respective said flash pulse detector detecting a flash pulse over its respective said RS line;

said DTE's in said first and second plurality then mutually selecting a second one of said DTE's thereof to assume said active participation mode and the remainder of said DTE's thereof to assume said passive participation mode as a second remainder of said DTE's thereof;

the respective said second auxiliary AND gate in said second one of said DTE's selectively outputting an enabling signal to its respective said digital switch in response to receiving a high value for the respective said auxiliary signal output over the respective M lead output from its respective call processor and data activity being detected on its respective SD line;

the respective said auxiliary latching gate in each of said second remainder of said DTE's selectively preventing said outputting of the respective said enabling signal from its respective said second auxiliary AND gate to its respective said digital switch in response to its respective said flash pulse detector detecting a flash pulse over its respective said RS line;

whereby said active participation mode may be transferred between said DTE's.

21. A method for controlling self-switched data port in-band signaling for a TDMA communications controller, for selectively transferring data signals through a data port between a data terminal equipment (DTE) and a TDMA digital switch in said communications controller or transferring control signals between said DTE and a call processor in said communications controller, said DTE including means for selectively outputting dial pulse control signals or data signals on a send data (SD) line connected thereto to said data port and outputting a request-to-send signal on a request-to-send (RS) line connected thereto to said data port, comprising the steps of:

storing in a status register having an input connected to said call processor in said communications controller, a status word output therefrom including a call connection signaling bit, for indicating when said data port is alternately in a call connection state or a data traffic state;

maintaining said E lead input to said call processor in a low state when said RS line is in a low state representing a quiescent state for said data port;

raising an E lead input to said call processor to a high state when said RS line is entering a high state and said signaling bit is in a low state representing said DTE initiating a call request to said data port;

raising said signaling bit to a high state by said call processor, in response to said E lead input, outputting a status word to said status register;

disabling a transmit buffer in response to said high state of said signaling bit, preventing information input on said SD line from being transmitted to said digital switch;

passing call connection dialing pulses from said SD line as E lead input signals to said call processor;

whereby said SD line from said DTE to said data port is selectively switched from a data transfer line connected to said digital switch, to an in-band call connection dial pulse control line connected to said call processor.

22. The method for controlling self-switched data port in-band signaling of claim 21, which further comprises the steps of:

said DTE having a receive data (RD) line connected thereto for selectively receiving dial pulse control signals or data signals from said data port of said communications controller and having a receiver ready (RR) line connected thereto for receiving receiver ready signals from said data port;

disabling a receive buffer in response to said high state of said signaling bit, preventing data to be output therefrom, from said digital switch;

outputting call connection dialing pulses from said call processor on an M lead which pass to said RD line, providing a call connection response to said DTE on said RD line during said call connection state for said data port;

said status register further including a port valid bit in said status word, for indicating that said call processor has allocated communication channels in said digital switch for use by said data port, said status output from said call processor raising said port valid bit to a high level;

forcing said RR line into a high state during said call connection state for said data port;

whereby said RD line from said data port to said DTE is selectively switched from a data transfer line connected to said digital switch, to an in-band call connection dial pulse control line connected to said call processor.

23. The method for controlling self-switched data port in-band signaling of claim 22, which further comprises the steps of:

determining in said call processor the completion of said call connection state for said data port and changing said signaling bit in said status register to a low state in response thereto, and further raising said M lead output to a high state in response thereto, signifying the termination of said call connection state and the commencement of said data traffic state;

maintaining by said M lead output from said call processor said RR line at said high state for the duration of said data traffic state for said data port;

enabling said receive buffer in response to said low state of said signaling bit, providing a data output from said digital switch for the duration of said data traffic state for said data port;

modulating said RD line by said data output from said receive buffer for the duration of said data traffic state for said data port;

whereby said RD line from said data port to said DTE is selectively switched from an in-band call connection dial pulse control line connected to said call processor, to a data transfer line connected to said digital switch.

24. The method for controlling self-switched data port in-band signaling of claim 23, which further comprises the steps of:

preventing data input on said SD line to pass to said call processor E lead input for the duration of said data traffic state for said data port;

enabling said transmit buffer in response to said low state of said signaling bit, providing a data input from said SD line thereto for the duration of said data traffic state for said data port;

whereby said SD line from said DTE to said data port is selectively switched from an in-band call connection dial pulse control line connected to said call processor, to a data transfer line connected to said digital switch.

25. The method for controlling self-switched data port in-band signaling of claim 24, which further comprises:

detecting malfunctions between said DTE and said data port and outputting a diagnostic signal in response thereto;

outputting from said call processor a select signal and a clock signal for synchronizing time multiplexed E lead slots on said E lead input to said call processor;

storing said call connection dial pulse control signals received on said SD line and outputting said dial signals on said E lead in response to said clock signal;

storing said diagnostic signal and outputting said diagnostic signal on said E lead in response to said clock signal;

said clock pulses when said select signal is received from said call processor, and outputting said call connection dial pulse control signals to said E lead after a first quantity of said clock pulses is counted and outputting said diagnostic signal to said E lead after a second quantity of said clock pulses is counted;

whereby said E lead input to said call processor transfers both call connection dial pulse control signals and diagnostic signals in a time multiplexed mode.

26. The method for controlling self-switched data port in-band signaling of claim 25, which further comprises the steps of:
said select signal and said clock signal output from said call processor synchronizing time multiplexed M lead slots on said M lead output from said call processor;
storing said call connection dial pulse control signals received on said M lead from said call processor in response to said clock signal;
storing auxiliary control signals received on said M lead from said call processor in response to said clock signal;
whereby said M lead output from said call processor transfers both call connection dial pulse control signals and auxiliary control signals in a time multiplexed mode.

27. The method of controlling self-switched data port in-band signaling of claim 26, wherein there is selective control of said digital switch for passive or alternately active participation of said DTE in a multipoint communication network or alternately for point-to-point communication of said DTE.

28. The method of controlling self-switched data port in-band signaling of claim 27, comprising the steps of:
outputting an enabling signal to said digital switch when said DTE is in a point-to-point communication mode in response to receiving an auxiliary signal from said call processor over said M lead;
detecting data activity on said SD line from said DTE;
selectively outputting an enabling signal to said digital switch when said DTE is in said active participation mode in said multipoint communication network, in response to receiving said auxiliary signal and detecting data on said SD line;
whereby said call processor can control said digital switch over said M lead, to transfer data from said data port in either said point-to-point or said multipoint communication mode.

29. The method of controlling self-switched data port in-band signaling of claim 28, which further comprises the steps of:
providing a flash pulse on said RS line having a shorter duration than an on-hook signal, in response to said DTE signaling that it is transferring from said active participation mode to said passive participation mode in said multipoint communication network;
detecting said flash pulse on said RS line;
preventing said outputting of said enabling signal to said digital switch when said DTE is in said passive participation mode in said multipoint communication network.

30. The self-switched data port in-band signaling of claim 29, which further comprises the steps of:
said multipoint communication network including a first plurality of said DTE's connected to respective ones of said data ports in said TDMA communications controller sharing said digital switch and a second plurality of said DTE's connected to respective ones of said data ports in remote ones of said TDMA communications controllers communicating over a TDMA link;
said DTE's in said first and second plurality mutually selecting a first one of said DTE's thereof to assume said active participation mode and the remainder of said DTE's thereof to assume said passive participation mode as a first remainder of said DTE's thereof;
said first one of said DTE's selectively outputting an enabling signal to its respective said digital switch in response to receiving a respective said auxiliary signal output over the respective M lead output from its respective call processor and data activity being detected on its respective SD line;
each of said first remainder of said DTE's selectively preventing said outputting of the respective said enabling signal to its respective said digital switch in response to its respective detecting of a flash pulse over its respective said RS line;
said DTE's in said first and second plurality then mutually selecting a second one of said DTE's thereof to assume said active participation mode and the remainder of said DTE's thereof to assume said passive participation mode as a second remainder of said DTE's thereof;
said second one of said DTE's selectively outputting an enabling signal to its respective said digital switch in response to receiving a respective said auxiliary signal output over the respective M lead output from its respective call processor and data activity being detected on its respective SD line;
each of said second remainder of said DTE's selectively preventing said outputting of the respective said enabling signal to its respective said digital switch in response to its respective detecting of a flash pulse over its respective said RS line;
whereby said active participation mode may be transferred between said DTE's.

* * * * *